(12) United States Patent
Sobolewski

(10) Patent No.: US 11,913,785 B2
(45) Date of Patent: Feb. 27, 2024

(54) EXTENDED REACH RING INTERFEROMETER WITH AT LEAST TWO BROADBAND LIGHT SOURCES AND SIGNAL ANTIFADING TOPOLOGY FOR EVENT DETECTION, LOCATION AND CHARACTERIZATION

(71) Applicant: Huvr, Inc., Colorado Springs, CO (US)

(72) Inventor: Zbigniew Sobolewski, Monument, CO (US)

(*) Notice: Subject to any disclaimer, the term of this patent is extended or adjusted under 35 U.S.C. 154(b) by 242 days.

(21) Appl. No.: 17/234,712

(22) Filed: Apr. 19, 2021

(65) Prior Publication Data

US 2021/0325169 A1 Oct. 21, 2021

Related U.S. Application Data

(60) Provisional application No. 63/011,960, filed on Apr. 17, 2020.

(51) Int. Cl.
*G01B 9/02* (2022.01)
*G01B 9/02015* (2022.01)
*G01C 19/72* (2006.01)

(52) U.S. Cl.
CPC ....... *G01B 9/02023* (2013.01); *G01C 19/727* (2013.01); *G01C 19/728* (2013.01)

(58) Field of Classification Search
CPC ............ G01B 9/02023; G01C 19/727; G01C 19/728; G01C 19/72; G01H 9/004
See application file for complete search history.

(56) References Cited

U.S. PATENT DOCUMENTS

| 4,375,680 | A | 3/1983 | Cahill et al. |
| 4,488,040 | A | 12/1984 | Rowe |
| 4,787,741 | A * | 11/1988 | Udd ................. G01H 9/004 356/35.5 |
| 4,898,468 | A | 2/1990 | Udd |
| 5,311,592 | A | 3/1994 | Udd |
| 5,455,698 | A | 10/1995 | Udd |
| 5,694,114 | A | 12/1997 | Udd |
| 6,370,164 | B1 | 4/2002 | Islam |
| 6,459,486 | B1 | 10/2002 | Udd et al. |
| 6,490,045 | B1 | 12/2002 | Dakin et al. |

(Continued)

FOREIGN PATENT DOCUMENTS

WO 2009103126 8/2009

OTHER PUBLICATIONS

He Wang et al., Improved location algorithm for multiple intrusions in distributed Sagnac, Optic Express, 2014, vol. 22, Issue 07 pp. 7587-7597, OSA Publishing, Washington DC, USA.

(Continued)

*Primary Examiner* — Hwa Andrew Lee
(74) *Attorney, Agent, or Firm* — CIONCA IP Law P.C.

(57) ABSTRACT

An optical fiber ring interferometer is provided, which is based on a common light path for two or more light beam pairs preferably originated from two or more light sources of a substantially different spectrum or from a single light source split spectrum and whereas each light beam of a specific pair is propagating in relative opposite directions, wherein at least one pair of light beams is utilized to detect acousto-mechanical events and to provide information regarding location and other characteristics of detected environmental disturbance.

4 Claims, 17 Drawing Sheets

(56) References Cited

U.S. PATENT DOCUMENTS

| | | |
|---|---|---|
| 6,529,444 B2 | 3/2003 | Vakoc |
| 7,139,476 B2 | 11/2006 | Patel et al. |
| 8,289,521 B2 | 10/2012 | Blin et al. |
| 8,395,782 B2 | 3/2013 | Patel et al. |
| 9,091,155 B2 | 7/2015 | Barfoot |
| 9,356,691 B2 | 5/2016 | Johnson et al. |
| 9,816,374 B2 | 11/2017 | Sobolewski et al. |
| 10,598,544 B2 | 3/2020 | Yang et al. |
| 2009/0277629 A1 | 11/2009 | Mendez et al. |
| 2016/0040530 A1 | 2/2016 | Sobolewski et al. |
| 2017/0160315 A1 | 6/2017 | Müller et al. |

OTHER PUBLICATIONS

Jeff Bush et al. Buried fiber intrusion detection sensor with minimal false alarm rates, journal, May 6, 1998, pp. 1-11, Van Nuys CA, USA.

Stuart Russell et al., Real-Time Location of Multiple Time-Varying Strain Disturbances, Acting Over a 40-km Fiber Section, Using a Novel Dual-Sagnac Interferometer, Journal of Lightwave Technology, Feb. 2, 2002, pp. 205-213, vol. 19, Issue 02.

\* cited by examiner

EXTENDED REACH RING INTERFEROMETER WITH AT LEAST TWO BROADBAND LIGHT SOURCES AND SIGNAL ANTIFADING TOPOLOGY FOR EVENT DETECTION, LOCATION AND CHARACTERIZATION

CROSS-REFERENCE TO RELATED APPLICATIONS

This application claims the benefit of U.S. Provisional Application No. 63/011,960, filed Apr. 17, 2020, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to optical fiber ring interferometers and more specifically to an improved optical fiber ring interferometer which mitigates signal fading and can detect, locate, and characterize events, such as acousto-mechanical disturbances.

2. Description of the Related Art

A ring interferometer, as known to a person of ordinary skill in the art (POSITA), is a common path interferometer which uses the Sagnac effect to act as a rate of rotation detector (Fiber ring interferometer, V. Vall and R. W. Shorthill, 1976), e.g., a fiber optic gyroscope (FOG). Also known to a POSITA, the ring interferometer can be constructed to largely rotation insensitive, such that it can be more effectively used for event detection and characterization.

The ring interferometer is widely used to detect rotational motion which occurs perpendicular to the plane of the ring interferometer loop, wherein the effect on the ring interferometer due to the detected movement is proportional to the total integral surface of the interferometer loop. Multiple topological variants of a ring interferometer, including the one used by Georges Sagnac in his 1913 experiment, are deployed for wide range of specialized applications. For example, in 1996 Y. C. Chao and P. T. Soderman from NASA Ames Research Center published "Fiber-Optic Interferometric Sensors for Measurements of Pressure Fluctuations: Experimental Evaluation" in which the use of a ring interferometer as a physical acousto-mechanical disturbance detector was described. Additional optical fiber based topologies of a ring interferometer are described in U.S. Pat. Nos. 6,459,486, 6,490,045, 7,139,476, 9,356,691, 10,598,544, and many more. One special topology, as described in the U.S. Pat. No. 9,816,374 by Sobolewski, et al. "High data-rate telemetry pulse detection with a Sagnac interferometer," is largely rotation insensitive due to the special counter-rotational winding of the reference coil and sensing extension of the optical fiber, which guides counterpropagating light beams.

Some topologies for ring interferometers predominantly utilize a relatively short length of optical fiber for the sensing element (Sf) and a significantly longer length of optical fiber for the reference coil (Cf). The frequency bandwidth and gain of the detected signal is dependent on the length of optical fiber in the reference coil. Such a dependency results in signal fading, as known to a POSITA, which lessens the ring interferometers ability to detect disturbances.

Assuming that the sensing element detecting disturbances can be treated as a point sensor, then the signal ($As(t)$) received at the light detector will be proportional to the disturbance level change ($\Delta V(t)$) over the time ($\Delta t$) necessary for the light beam to traverse through the reference coil fiber length (Cf) at the light speed (Cg) in the optical fiber. This mean the signal amplitude is directly proportional to the optical fiber length (Cf) in the reference coil and dynamics (power) of the detected disturbance.

$$As(t)=Ax*\Delta V(t) \qquad (1)$$

where Ax is a constant representing the conversion efficiency and gain of the light detector.

$$\Delta t = Cf/Cg \qquad (2)$$

For a low frequency disturbance, the observed momentary change in level of the disturbance V(t) can be approximated by $$\Delta V(t)=Cv(t)*\Delta t \qquad (3)$$

where Cv represents the slope of the disturbance signal V(t). Thus, $\Delta V(t)$ at $t_0$ can be calculated as $$\Delta V(t)=\int_{t0}^{t0+\Delta t} Cv(t)dt \qquad (4)$$

and therefore, for a slowly changing disturbance, which can be approximated by equation (3) over the time $\Delta t$, the disturbance level change $\Delta V(t)$ can be approximated by $$\Delta V(t_0)=Cv(t_0)*\Delta t \qquad (5)$$

From (1) and (5)

$$As(t_0)=Ax*Cv(t_0)*\Delta t \qquad (6)$$

we can see that the signal As(t) received at the light detector is directly proportional to the time $\Delta t$, which is calculated as the time it takes the light beam to traverse the length of the optical fiber in the reference coil (Cf) at speed of light (Cg). Thus, $$As(t)=Ax*Cv(t)*Cf/Cg \qquad (7)$$

Again, it is clear that the detected signal As(t) is proportional to the length of the optical fiber in the reference coil (Cf).

In another known topology, as shown in FIG. 1, the sensing element (Sf) 8 is of a significant length, i.e., the length is comparable to or exceeding the length of optical fiber in the reference coil 3. In this topology, the signal (As(t)) at the light detector 7 is dependent on the length of the reference coil (Cf) 7 plus the length difference (S'−S") between fiber segments to the left (S') and right (S") of the point of interest, i.e., where a localized disturbance 11 occurs, as shown by equation (8). It should be understood that S'+S"=Sf.

$$As(t)=Ax*Cv(t)*(Cf+S'-S")/Cg \qquad (8)$$

From equation (8), it is clear that detected signal level As(t) will approach zero if the point of interest is located where fiber lengths Cf+S' approach S", i.e., signal fading of As(t) when Cf+S' approach S". Signal fading is disadvantageous because a localized disturbance 11 will not be detected near such a point of interest.

In another known topology of a ring interferometer, as shown by FIG. 2, the sensing extension 8 is substantially longer, usually exceeding hundreds of meters. In this case, the ring interferometer can utilize a self-referencing topology, such that the reference coil is eliminated, and the detected signal level As(t) is simplified to $$As(t)=Ax*Cv(t)*(S'-S'')/Cg \qquad (9)$$

In a self-referencing ring interferometer, signal fading occurs near the midpoint of the sensing extension 8, as shown by the point of interest 12. Signal fading reduces a ring interferometers usefulness as a method of disturbance detection because portions of the sensing extension 8 will not detect the disturbance.

As understood by a POSITA, disturbance detection by the sensing extension is dependent on the length of extension affected by the disturbance. Under most environmental conditions some disturbances, such as a localized or low energy disturbance, will fall below the detection threshold of the ring interferometer because the disturbance does not affect the necessary length of the sensing element. Additionally, in some ring interferometer system deployments, the signal from a disturbance traverses through the environment, e.g. air, before reaching the sensing element. The environment has substantially different acousto-mechanical impedance than the sensing element, thus impeding disturbance signal detection due to reflection and a low energy transfer efficiency.

Once a disturbance is detected, it must be characterized, i.e., the location and source. An analysis for the signal dependency on the location of the disturbance can be found in the February 2001 publication by Stuart J. Russell, et, all. "Real-Time Location of Multiple Time-Varying Strain Disturbances, Acting Over a 40-km Fiber Section, Using a Novel Dual-Sagnac Interferometer".

Known ring interferometer systems, including those based on Sagnac Interferometer variations and hybrid topologies, are focused on determining the disturbance location via a time-of-flight measurement and frequency spectrum analysis. In practical applications, the required spatial resolution must be better than +/−50 m, which would further require a digital sampling rate of 10 Ms/sec or higher. The resulting data set size would be very large and significant data processing power would be needed to analyze the data. Additionally, frequency spectrum analysis is not very useful in cases where disturbance signal bandwidth is limited by environmental attenuation of higher frequencies. Thus, using time-of-flight to determine disturbance location can be difficult and limiting.

Most optical fiber ring interferometers used for disturbance detection utilize a multitude of variants and modifications to the traditional common path fiber optic ring interferometer in order to operate. Often active phase modulators are uses, which results in complex detection and data processing methodologies.

Traditional implementation of the ring interferometer is based on incorporating the optical fiber sensing extension into the environment under observation, and reference coil into the System Instrumentation enclosure. Such an implementation may allow for a symmetric dual path topology, but it is not flexible enough if multiple paths need to be implemented.

Other known implementations of multiple wavelength ring interferometers are based on wavelength division-multiplexer (WDM) devices splitting a wide band light of light provided by the source, then directing each light band thru a single (U.S. Pat. No. 9,356,691 B2) or dual (U.S. Pat. No. 6,490,045 B1) reference coil. This topology is highly symmetrical, rendering it virtually impossible to use in multi-wavelength systems and making it prone to inter-wavelength interference.

Therefore, there is a need to solve the problems described above by providing an improved optical fiber ring interferometer for disturbance detection, location, and characterization.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The disclosed invention mitigates the problem of the signal fading occurring along the interferometer loop and provides a simplified methodology based on the signal energy ratio for disturbance location and characterization, which has not previously been considered by others.

In one aspect, signal fading in a single-path ring interferometer topology is mitigated by relocating the reference coil to the center of the sensing extension.

In another aspect, signal fading in a multi-path ring interferometer topology is mitigated by rearrangement of the topology of the interferometer loop, such that the insensitivity points of the counter propagating light pairs are positioned at different locations along their respective superimposed sensing extensions.

In another aspect, signal fading in a multi-wavelength ring interferometer topology is mitigated by rearrangement of interferometer loop topology, such that the insensitivity points of the different wavelengths of counter propagating light beam pairs are positioned at different locations along the sensing extension.

An advantage of the disclosed invention is the simplified disturbance location and characterization analysis. Rather than using difficult to discern time-of-flight dated to determine the disturbance location and characterization, the disclosed invention determines disturbance location and characterization based on analysis of the received signal power in each path of a multi-path ring interferometer topology. In multi-wavelength ring interferometer topologies, the disclosed invention determines disturbance location and characterization based on analysis of the received signal power corresponding to each wavelength. Furthermore, the disclosed invention uses a data sampling rate approximately 100× lower than known methods, which is sufficient for acoustic signal acquisition. Additionally, the invention uses a simple processing algorithm for real time sliding window signal power integration and comparison.

Another problem solved is that the disturbance may be below the detection threshold for highly localized or low energy disturbances because, under most environmental conditions, the disturbance signal detected by the sensing loop depends on the length of loop affected by the disturbance. Including a plurality of concentrated point sensors, such as coils or bundles, intermittently located along the sensing loop creates a chain of passive signal concentrators (microphones), which increases the detected signal strength. Several optimizations can be achieved by incorporating a plurality of concentrated point sensors, such as placement of the insensitivity points where the signal detection is not needed or optimally separated from similar points in other sensing loop paths. Additionally, the phase of signal detected at each side of the reference coil is reversed and therefore the disturbance location can be better established when the disturbance phase from one sensing loop is compared to phase of signal from the other sensing loop path.

Yet another problem solved is the issue of the disturbance signal being impeded by the environment, such as air, due to reflection and low energy transfer efficiency. By using impedance matching techniques, such as a low weight and flexible membranes with a non-ruggedized section of optical fiber attached to or incorporated into the sensing extension. a chain of passive impedance matching signal concentrators (microphones) is created, thus increasing the detected signal strength.

In another aspect, inter-wavelength interference, which occurs in known implementations of multiple wavelength ring interferometers which are based on WDM devices splitting wide band light of light source and directing each light band thru a single (U.S. Pat. No. 9,356,691 B2) or dual (U.S. Pat. No. 6,490,045 B1) reference coil. This known topology is highly symmetrical, virtually impossible to use in multi-wavelength systems and prone to inter-wavelength interference. The disclosed invention eliminates inter-wavelength interference by using separate light sources with significantly different emission band center frequencies, Additionally, use of separate coils for each wavelength at arbitrary locations along sensing extension provides for topological flexibility and optimization of optical circuit.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
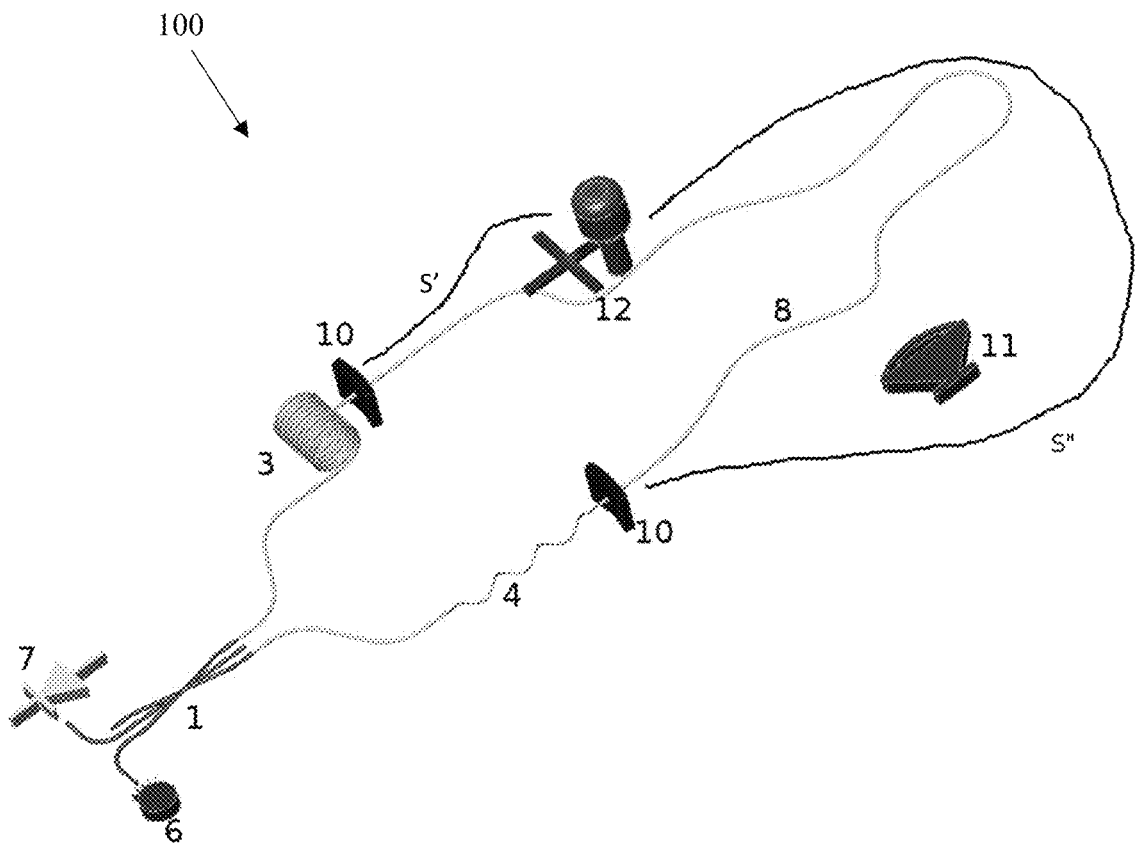
FIG. 1 is a prior art reference which illustrates a ring interferometer 100 with classical topology, wherein signal fading occurs on the sensing element 8 near the reference coil 3, as disclosed herein in the background, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 is a prior art reference which illustrates a ring interferometer 100 with classical topology, wherein signal fading occurs on the sensing element 8 near the reference coil 3, as disclosed herein in the background, according to an aspect.

Figure 2:
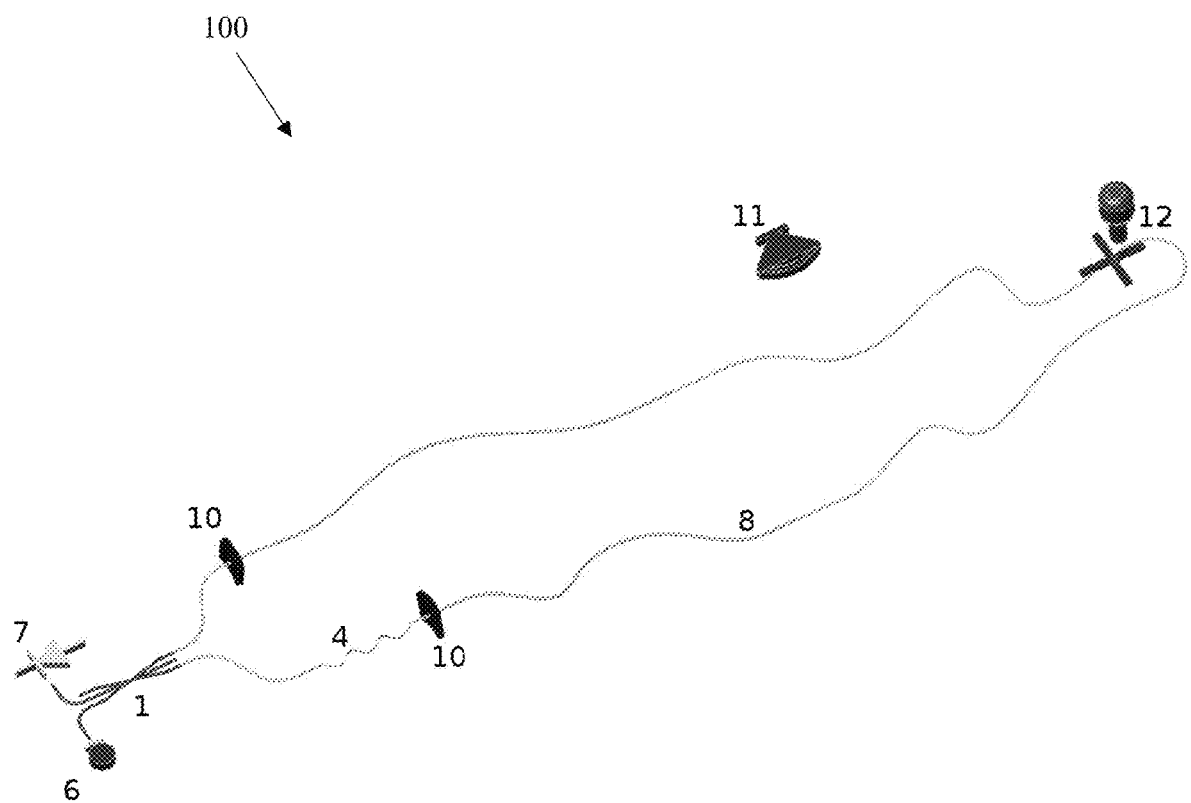
FIG. 2 is a prior art reference which illustrates a ring interferometer 100 with a self-referencing topology and an extended sensing element 8, wherein signal fading occurs at the midpoint of the sensing element 8, as disclosed herein in the background, according to an aspect.

FIG. 2 is a prior art reference which illustrates a ring interferometer 100 with a self-referencing topology and an extended sensing element 8, wherein signal fading occurs at the midpoint of the sensing element 8, as disclosed herein in the background, according to an aspect.

An ideal application for a ring interferometer 100 is for protecting the perimeter of a large area (property) against intrusion. This is accomplished by burying an optical fiber cable, as known to a person ordinary skill in the art (POSITA), which utilizes the Sagnac interferometric effect resulting from a sensing element (sensing extension) 8, around the perimeter of the area being affected by disturbance events (events, disturbances) 11, such as acousto-mechanical events, as known to a person of ordinary skill in the art (POSITA). It should be understood that the optical fiber cable can be also attached to a fence or other raised structure, such as walls. Examples of acousto-mechanical events include but are not limited to a person or animal walking, a car driving, or a large object impacting the ground.

The optical fiber cable used for the sensing extension 8 is chosen to be of a length which exceeds the length of the optical fiber in the reference coil 3, as shown in FIG. 1. Alternatively, the length of sensing extension 8 may be configured to be sufficiently long for the ring interferometer 100 to act as a self-referencing system, as shown in FIG. 2. For ring interferometers with said sensing extension 8 lengths, the bandwidth and amplitude (gain) of the signal detected at the light detector 7, wherein the detected signal has been affected by a disturbance 11, is dependent on the length of optical fiber in the reference coil 3 and on the location of that disturbance along the sensing extension. In the configuration shown by FIG. 1, signal fading 12 is observed at a specific location near the reference coil, as disclosed hereinbefore. In the configuration shown by FIG. 2, signal fading 12 is observed at the midpoint of the sensing extension 8, as disclosed hereinbefore As known to a POSITA, the frequency threshold at which the light detector (signal detector) 7 observes potential aliasing effect increases and the amplitude is decreasing as the signal fading point 12 is approached, i.e., disturbance 11 signal will not be detected. FIGS. 1,2 illustrate two known topologies with a signal fading point (12) where the ring interferometer will fail to detect existence of disturbance. A ring interferometer intended for use in detecting acousto-mechanical disturbances occurring on a property perimeter should not have segments which are insensitive to disturbances. Thus, the topologies disclosed hereinafter provide a solution for mitigating signal fading.

Figure 3:
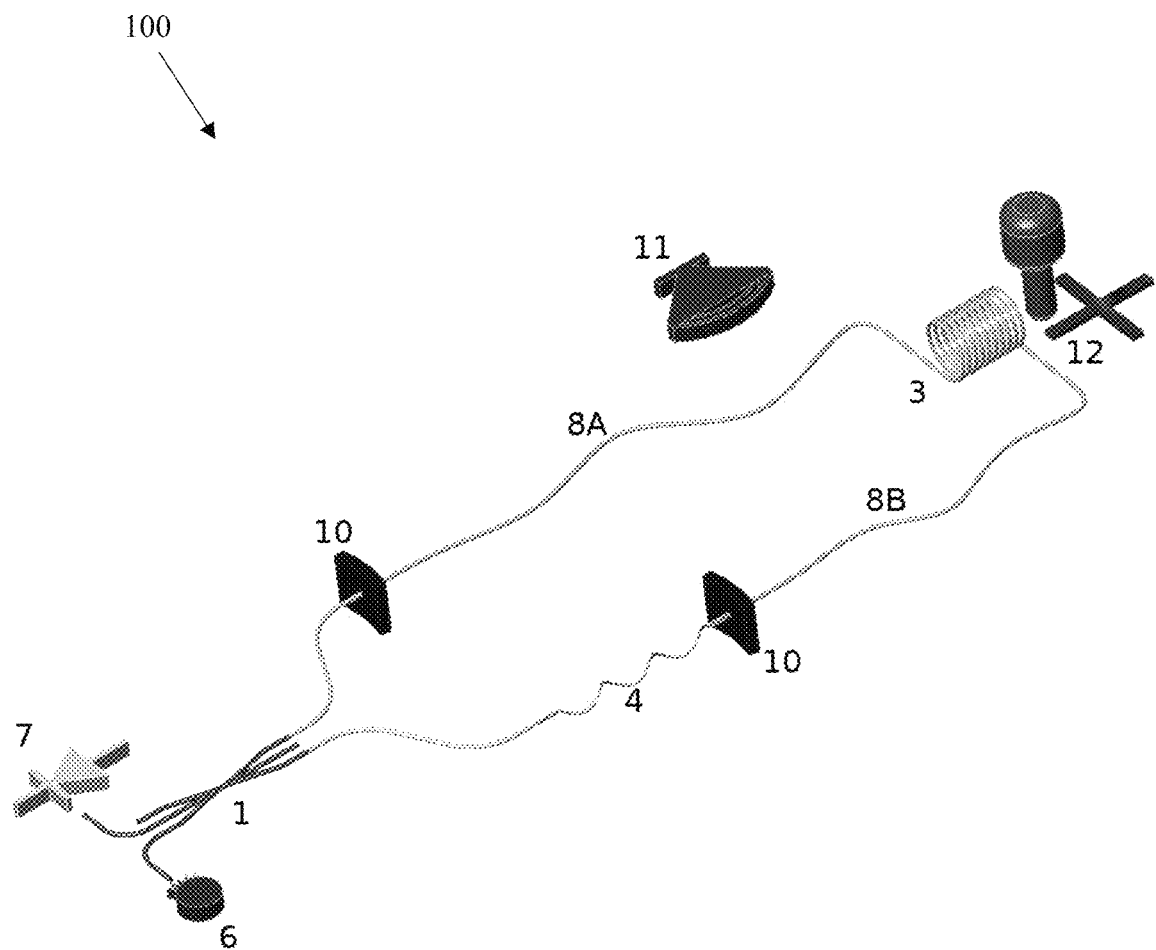
FIG. 3 illustrates an exemplary embodiment of a fiber optic ring interferometer (ring interferometer) 100, wherein the reference coil 3 positioned at the midpoint of the sensing element (sensing extension) 8A, 8B to mitigate signal fading, as disclosed in greater detail herein, according to an aspect.

FIG. 3 illustrates an exemplary embodiment of a fiber optic ring interferometer (ring interferometer) 100, wherein the reference coil 3 positioned at the midpoint of the sensing element (sensing extension) 8A,B to mitigate signal fading, as disclosed in greater detail herein, according to an aspect. The exemplary ring interferometer 100 topology shown in FIG. 3 may comprise a three way splitter 1, a reference coil 3, a depolarizing element 4, a light source 6, a light detector (signal detector) 7, a sensing element (sensing extension) 8A,B, and two apertures (optical fiber connectors) 10. constituting interfaces (optical fiber connectors) between system instrumentation and the extended sensing element. Also shown is an exemplary disturbance 11 and a point of interest 12 where signal fading occurs.

It should be noted that the term "interferometer loop" refers to the entire path traveled by the counterpropagating light beams, wherein the first end and second end of the interferometer loop occur at the three-way splitter 1.

The topology of FIG. 3 relies on positioning the reference coil 3 fortification at the midpoint of the sensing extension 8A,B, thus fortifying the ring interferometer against intrinsic insensitivity, which occurs at the center of the sensing extension 8A,B, as shown. In other words, the reference coil 3 is placed at the point where complete signal fading 12 occurs, which acts to hide the point of complete signal fading 12. It should be understood that the optical fiber sensing extension portions to the left 8A and right 8B of the reference coil 3 are fully sensitive to acousto-mechanical disturbances 11. It should be further understood that the ring interferometer's 100 sensitivity to detect disturbance 11 signals (signal gain) increases at the ends of the sensing extension 8A,B near the instrument apertures 10. Thus, ring interferometer 100 topology shown by FIG. 3 exhibits three very useful characteristics which aid in event 11 location and characterization.

Firstly, for an exemplary large disturbance amplitude detected by the interferometer 100 of FIG. 3, the ring interferometer's signal aliasing frequency threshold, due to interferometric fringe jumping, is observed at lower frequency near the apertures 10 than it is near the reference coil 3. In cases where large signal aliasing occurs, this effect can be used to determine the disturbance location via analyzing in the frequency domain the relationship of the signal received at the light detector 7 to the signal amplitude when large signal aliasing occurs.

Secondly, for an exemplary frequency of a small disturbance, the received signal amplitude is higher when the disturbance is located closer to the apertures 10 than it would be if the small disturbance is located near the reference coil 3. This effect is fundamental for determination of event location in dual-path systems, such as the dual-path system disclosed when referring to FIGS. 11,12.

Thirdly, if a single localized disturbance source 11 is detected at both sides of the reference coil 3, then the signal received by the light detector 7 will observe a disturbance event at two different times. It should be understood that the signals received at those two different times are inversions of one another, albeit the amplitudes can be different due to different distance from the source of disturbance. This is due to the propagation speed of the disturbance 11 signal thru the environment. Analyzing the received signal in the time domain will result in determination disturbance characteristics. In particular, the of the point of origin of the disturbance, whether the disturbance originated within the sensing extension 8 or outside the extension, and which direction the disturbance was traveling.

It should be noted that further analysis of the received signal can result in determination of yet more disturbance characteristics, such as what is causing the disturbance, for example. It should be noted that it is also possible to detect rapid thermal disturbances, such as an explosion, with the novel ring interferometer topologies disclosed herein when referring to FIGS. 3-17.

FIGS. 4-7 additional topologies which may be utilized to enhanced disturbance event location and characterization. As disclosed in greater detail herein when referring to the following topologies, the light source 6 is split into narrower spectral bands via two-way splitters 2 and bandpass filters (light filters) 5. Exemplary light filters 5 may include Bragg Grating elements tuned to a light wavelength of interest or wavelength division-multiplexer (WDM) devices.

Figure 4:
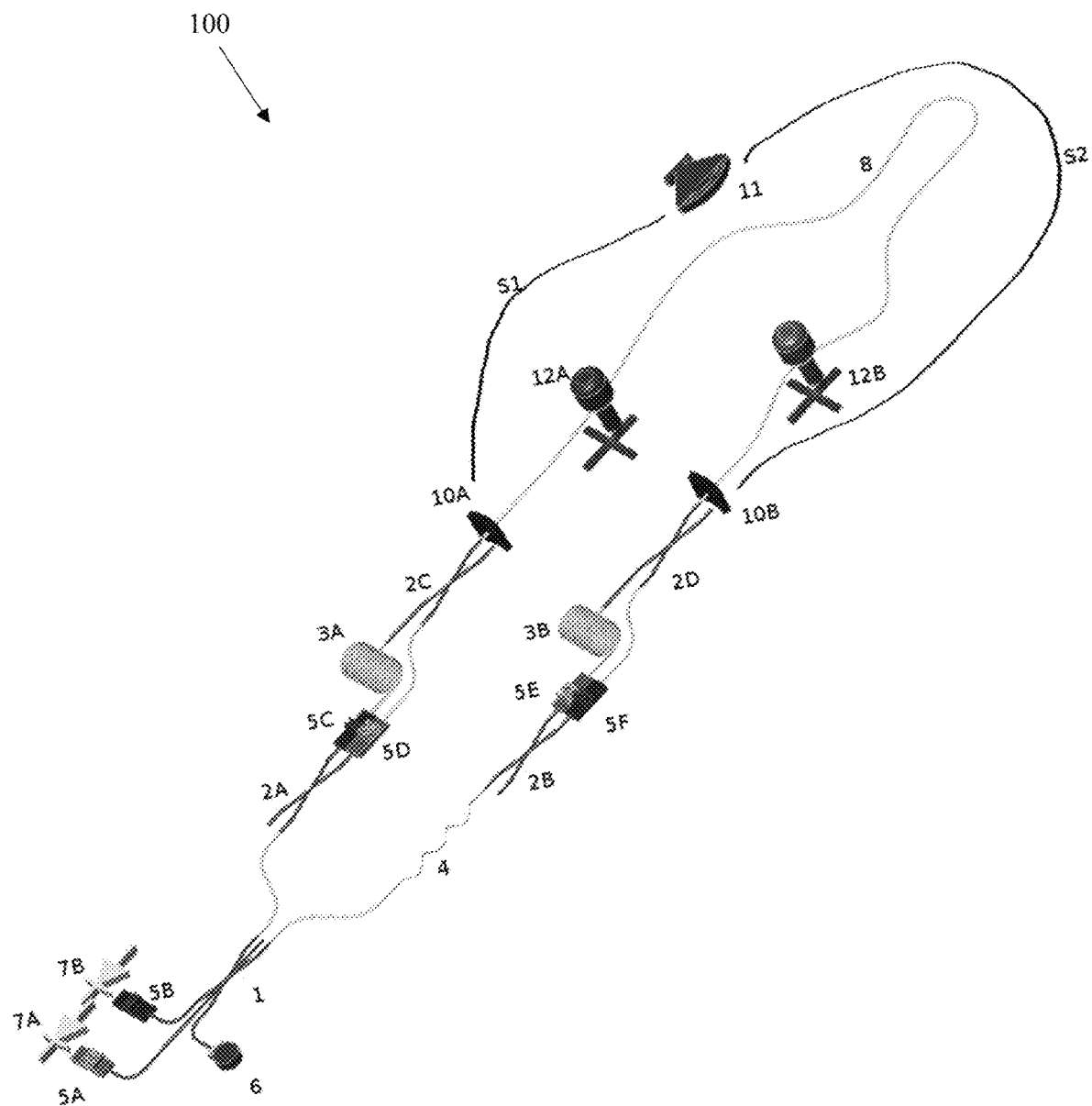
FIG. 4 illustrates another exemplary embodiment of a ring interferometer 100 with a dual-wavelength configuration, wherein two reference coils 3A, 3B are positioned at either end of the sensing extension 8, as disclosed in greater detail herein, according to an aspect.

FIG. 4 illustrates another exemplary embodiment of a ring interferometer 100 with a dual-wavelength configuration, wherein two reference coils 3A, 3B are positioned at either end of the sensing extension 8, as disclosed in greater detail herein, according to an aspect. The exemplary ring interferometer 100 topology shown in FIG. 4 may comprise a three way splitter 1, four two way splitters 2A-D, two reference coils 3A,B, a depolarizing element 4, six band pass filters 5A-F, a light source 6, two light detectors (signal detectors) 7A,B, a sensing element (sensing extension) 8, and two apertures 10A,B. Also shown is an exemplary disturbance 11 and two points of interest 12A,B where signal fading occurs.

In ring interferometer 100 topology shown by FIG. 4, a light beam is emitted by wide bandwidth light source 6. Then, the wide bandwidth light beam is split by three-way splitter 1 into two wide bandwidth light beams characterized by 120 degree of phase shift, thus creating a counterpropagating wide bandwidth light beam pair. Next, the wide bandwidth light beams are split by two-way splitters 2A,B and then directed into the branches with light filters 5C,D and 5E,F, respectively. It should be noted that light filters 5C and 5F filter the wide bandwidth into the same spectrum, such as a longer wavelength spectrum. Additionally, light filters 5D and 5E filter the wide bandwidth light beam into the same spectrum, which is different than the spectrum filter the light filters 5C,F, such a shorter wavelength spectrum. Thus, two counterpropagating light beam pairs are created, wherein one pair is in a longer spectrum and the other pair is in a shorter spectrum, for example. In one example, the longer wavelength spectrum may be centered at 1500 [nm] and the shorter wavelength spectrum may be centered at 1300 [nm]. In another example, whereas ["red"] and ["green"] indicate different wavelength rather than the specific color.

Next, one of the filtered light beams from each of the two counterpropagating pairs passes through a reference coil, i.e., the longer wavelength spectrum light beam from filter 5C passes through reference coil 3A and the shorter wavelength spectrum light beam from 5E passes through the reference coil 3B. Then, the two filtered light beams are recombined by two-way splitters 2C,D. Then, the recombined light beams pass through apertures 10A,B, cross as they travel along the sensing extension 8, and pass through the ring interferometer elements, as shown in FIG. 4. Finally, the counterpropagating light beams are transmitted via the three-way splitter 1 to two light detectors (signal detectors) 7A,B, which are monitoring the strength of received light beams at two different spectrums, for example the shorter wavelength spectrum and the longer wavelength spectrum, respectively.

As shown in FIG. 4, a filtered light beam of a specific spectrum α1, such as a longer spectrum, is traversing essentially a mirror image path to that of a second filtered light beam of a different specific spectrum α2, such as the shorter wavelength spectrum. It should be understood that each filtered light beam counterpropagating pairs experience signal fading at different locations, such as the longer wavelength spectrum pair at 12A and the shorter spectrum pair at 12B. This observation allows for the respective spectrum signals received at signal detectors 7A,B to be analyzed separately. For example, using virtual symmetry for event location and characterization without being affected by signal fading, or alternatively using one or both spectra fading points 12A,B for analytical advantage. It is important to observe that for a non-zero length of the optical fiber in the reference coils 3A,B the fading points 12A,B will always be separated, wherein the separation can be calculated as follows.

Since the signal fading point is always in the center of the total length of optical fiber, i.e., sensing extension length plus the reference coil length:

$$Cf1 + L1 = DL - L1$$

$$Cf2 + L2 = DL - L2$$

$$\text{Separation} = DL - L1 - L2$$

Resulting with:

$$\text{Separation} = (Cf1 + Cf2)/2$$

Wherein: Cf1 and Cf2 are lengths of reference coils 3A,B, respectively; DL denotes total length of the sensing extension 8 measured from aperture 10A to 10B, i.e., S1+S2; and L1 and L2 are distances of the signal fading points 12A,B from respective reference coils 3A,B.

Wherein: Cf1 and Cf2 are lengths of reference coils 3A,B, respectively; DL denotes total length of the sensing extension 8; and L1 and L2 are distances of the signal fading points 12A,B From this we can see that the length of optical fiber in both reference coils 3A,B is essential for determining the fading points 12A,B separation. L1 and L2 distances in FIG. 4 are representing S' and S" segment of the sensing extension (8) as shown in FIG. 1.

An exemplary acousto-mechanical disturbance's result, in a form of sound wave, can be conducted by the steel. The propagation of sound in steel is approximately equal to 5,000 [m/sec] as compared to 200,000,000 [m/sec] for light speed in optical fiber. That means that over the time the light traverses a 1,000 [m] long extension, the disturbance effect (the sound) in the steel may at best traverse 25 [mm].

Additionally, it means that at the 20 kHz frequency for the sound traversing steel structure, its phase will change only by ~36 degrees, and proportionally less for lower frequency of disturbance signals. Thusly, even the disturbance effect propagating the steel structure can be observed without risk of aliasing in ring interferometer systems which have sensing extension longer than 1,000 m and the location of the steel disturbance can be determined, assuming adequate signal measurements analysis are performed. An exemplary methodology for disturbance location and characterization is disclosed by the following.

For a ring interferometer 100 with the topology shown in FIG. 4, assuming the disturbance 11 is detected along the sensing extension 8 somewhere between the signal fading points 12A,B, the following is true.

$$(Cf1+S1-S2)/Cg=ET1$$

$$(Cf2+S2-S1)/Cg=ET2$$

$$(Cf1+S1-S2)/ET1=(Cf2+S2-S1)/ET2$$

Wherein: S1 and S2 are the lengths of optical fiber measured from apertures 10A,B to the disturbance 11, respectively; Cf1 and Cf2 are lengths of reference coils 3A,B, respectively; DL denotes total length of the sensing extension 8; and ET1 and ET2 represent time intervals over which the signal resulting from interferometric interaction of the counterpropagating beams of light are observed by signal detectors 7B,A, respectively. It should be understood that the time intervals ET1,2 represent the difference of time it takes a disturbance signal induced on the counterpropagating light beam pairs to travel from the disturbance 11 to each end of the interferometer loop and interfering at signal detectors 7B,A, respectively. It should also be understood that the signal detectors 7B,A are sensing light intensity changes, wherein those changes represent the phase change induced by the disturbance 11 on each of the counter-propagating light beam pair.

While Cf1=Cf2=Cf and S2=DL−S1 the calculation follows with:

$$(Cf+2*S1-DL)/ET1=(Cf-2*S1+DL)/ET2$$

$$2*S1/ET1+(Cf-DL)/ET1=-2*S1/ET2+(Cf+DL)/ET2$$

$$2*S1*(ET2+ET1)/(ET2*ET1)=((DL-Cf)*ET2+(DL+Cf)*ET1)/(ET1*ET2)$$

$$2*S1*(ET2+ET1)=(DL-Cf)*ET2+(DL+Cf)*ET1$$

$$S1=((DL-Cf)*ET2+(DL+Cf)*ET1)/(2*(ET2+ET1))$$

In case where ET1=ET2=ET, the following calculation show that the disturbance is detected at the midpoint of the sensing extension 8.

$$S1=(DL*ET-Cf*ET+DL*ET+Cf*ET)/(4*ET)$$

$$S1=2DL*ET/4*ET$$

$$S1=DL/2$$

This calculation is valid when disturbance (11) is detected along the sensing extension (8) outside of the segment defined by Fading Points (12A and 12B). In both cases for a given disturbance type, the detected signal by the corresponding detector will exhibit inverted phase however. It should be noted that, as signal amplitude (strength or power) are being discussed, an equation illustrating the phase reversal is not included. However, it should also be noted that the power of the oscillatory signal is represented by its square and therefore phase reversal (sign reversal) is irrelevant for power ratio calculation. Additionally, the phase reversal (sign reversal) can be observed however and included in enhanced signal processing algorithm.)

As shown in equations (4) and (5) in the Background section hereinabove, for a given disturbance strength, the signal strength induced by a disturbance and detected by corresponding detector is dependent on the point of impact along the sensing extension due to DV/DT dependency. For a ring interferometer 100 with the topology shown in FIG. 4, the impact point for a disturbance 11 can be determined by appropriate substitution of the signal strengths detected at the signal detectors 7B,A for ET1 and ET2 value since it is proven that the strength of the received signal arising from a given disturbance is dependent on point of impact location thru DL, Cf, S1 and S2 relations as shown in equation (8) of the Background.

For an exemplary clearly defined disturbance, such as a step-function, the ET1, ET2 intervals would be easily detected. Thus, S1, can be calculated and the disturbance location determined. If the value of S1 calculated to be a negative, then it means the disturbance occurs at a location |S1| distance measured from counter-respective aperture 10B. The important observation is that the determination of disturbance location is totally dependent on ability to measure both intervals ET1,ET2 from both signal detectors 7B,A and that, technically, no other measurement is needed. Additionally, it should be understood by a POSITA, that for typical disturbances which are rather slow in nature and in most cases oscillatory, the amplitude and the phase reversal effect of a detected signal will also be a function of the disturbance location and ultimately provide better and less complicated methodology for determination of disturbance location.

Figure 5:
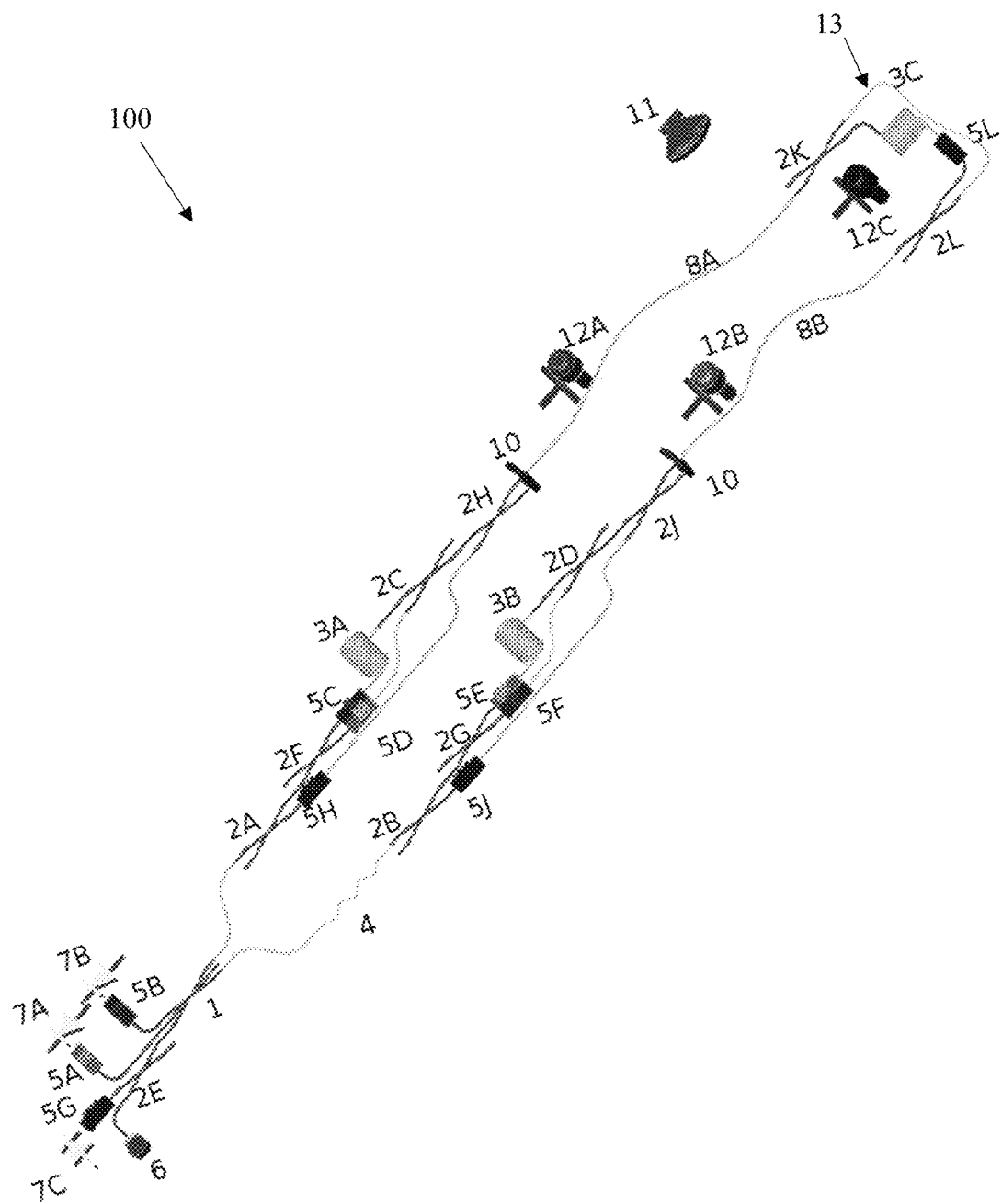
FIG. 5 illustrates another exemplary embodiment of a ring interferometer 100 with a triple-wavelength configuration, wherein two reference coils 3A, 3B are positioned at either end of the sensing extension 8A-C and a third reference coil 3C is positioned at the center of the sensing extension 8A-C, as disclosed in greater detail herein, according to an aspect.

FIG. 5 illustrates another exemplary embodiment of a ring interferometer 100 with a triple-wavelength configuration, wherein two reference coils 3A, 3B are positioned at either end of the sensing extension 8A-C and a third reference coil 3C is positioned at the center of the sensing extension 8A-C, as disclosed in greater detail herein, according to an aspect. The exemplary ring interferometer 100 topology shown in FIG. 5 may comprise a three way splitter 1, eleven two way splitters 2A-H,J-L, three reference coils 3A-C, a depolarizing element 4, ten band pass filters 5A-H,J, a light source 6, three light detectors (signal detectors) 7A-C, a sensing element (sensing extension) 8A,B, and two apertures 10. Also shown is an exemplary disturbance 11 and three points of interest 12A-C where signal fading occurs.

Figure 6:
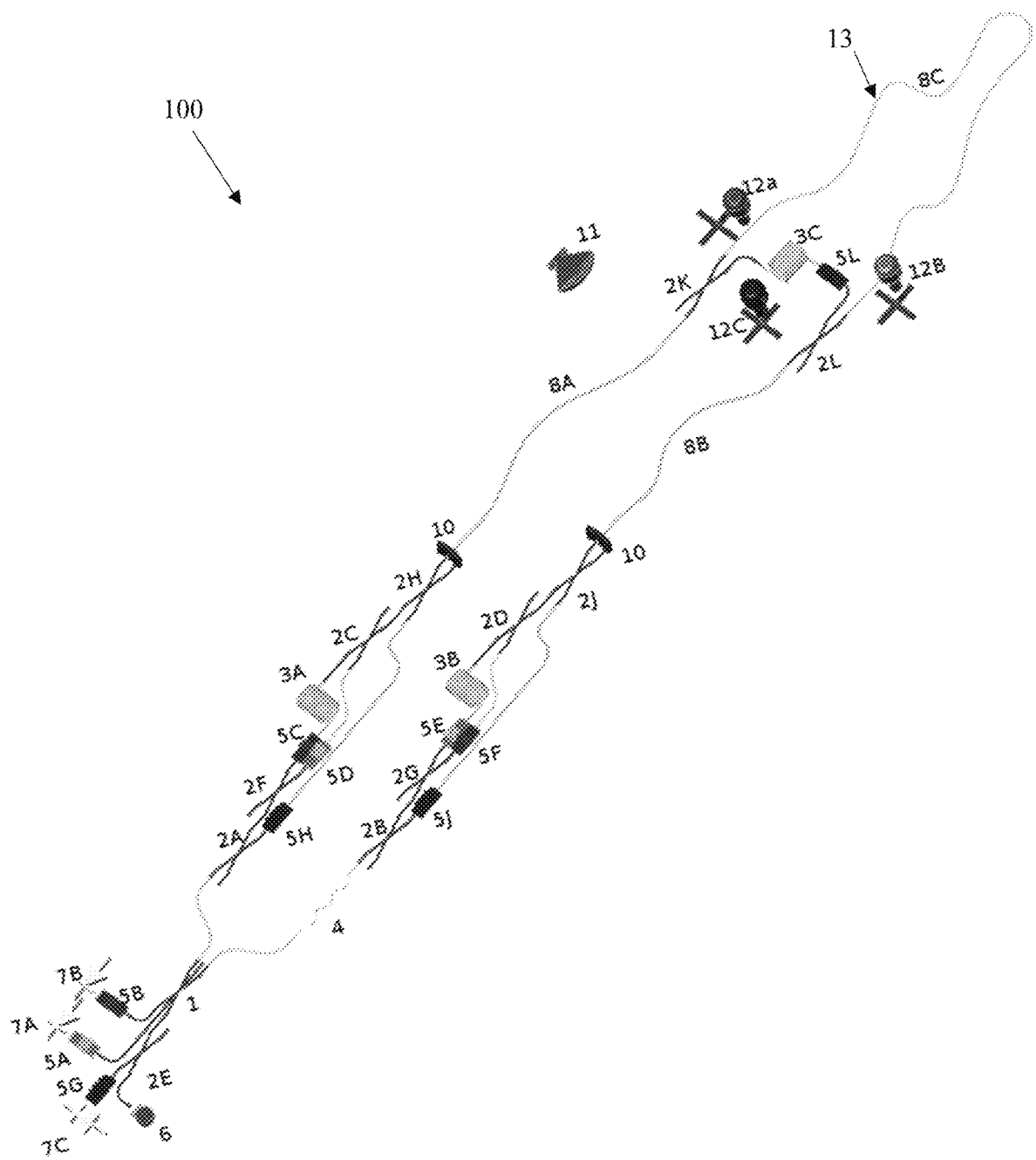
FIG. 6 illustrate another exemplary embodiment of a ring interferometer 100 with a triple-wavelength configuration, wherein two reference coils 3A, 3B are positioned at either end of the sensing extension 8A, 8B, 8C and a third reference coil 3C is positioned across an arbitrary location along the sensing extension 8A, 8B, 8C, as disclosed in greater detail herein, according to an aspect.

FIG. 6 illustrate another exemplary embodiment of a ring interferometer 100 with a triple-wavelength configuration, wherein two reference coils 3A, 3B are positioned at either end of the sensing extension 8A,B,C and a third reference coil 3C is positioned across an arbitrary location along the sensing extension 8A,B,C, as disclosed in greater detail herein, according to an aspect. The exemplary ring interferometer 100 topology shown in FIG. 6 may comprise a three way splitter 1, eleven two way splitters 2A-H,J-L, three reference coils 3A-C, a depolarizing element 4, ten band pass filters 5A-H,J, a light source 6, three light detectors (signal detectors) 7A-C, a sensing element (sensing extension) 8A-C, and two apertures 10. Also shown is an exemplary disturbance 11 and three points of interest 12A-C where signal fading occurs.

The ring interferometer 100 topologies illustrated by FIGS. 5 and 6 are essentially combinations of the topologies illustrated by FIGS. 3 and 4. The topologies of both FIG. 5 and FIG. 6 utilize three different light beam spectrums to create three pairs of counterpropagating light beams traversing a common path, wherein all three counterpropagating pairs are exposed to the same disturbances. As an example, the three specific spectrums may be a red spectrum α1, a green spectrum α2, and a blue spectrum α3. In both FIGS. 5 and 6 the light filters 5B,C,F are red spectrum α1 filters, light filters 5A,D,E are green spectrum α2 filters, and light filters 5F,H,J,L are blue spectrum α3 filters. Also shown by both FIGS. 5 and 6, the wide bandwidth light beam generated by the light source 6 is split by a three-way splitter 1 and a plurality of two-way splitters 2A-H,J-L, such that the red spectrum α1 counterpropagating pair passes through reference coil 3A, the green spectrum α2 counterpropagating pair passes though reference coil 3B, and the blue spectrum α3 counterpropagating pair passes though reference coil 3C. Additionally, it should be noted that in FIGS. 5 and 6 the point of signal fading for the red spectrum α1 counterpropagating pair is represented by 12A, green spectrum α2 counterpropagating pair is represented by 12B, and the blue spectrum α3 counterpropagating pair is represented by 12C.

The difference between the topology illustrated by FIG. 5 and the topology illustrated by FIG. 6 can be found in the positioning of the third reference coil 3C. In FIG. 5, the reference coil 3C is shown to bisect the sensing extension 8A,B, the blue spectrum α3 pair passes through the reference coil 3C and the other two spectrum pairs α1,2 bypass 13 reference coil 3C vi a short optical fiber. In FIG. 6, the bypass 13 is a much longer optical fiber, which can act as an extension 8C for the sensing extension 8A,B.

It should be understood that extrapolations can be made to the calculations disclosed herein when referring to FIG. 4, such that the extrapolated calculations can be used to analyze the multi-wavelength ring interferometer topologies of FIGS. 5 and 6.

Figure 7:
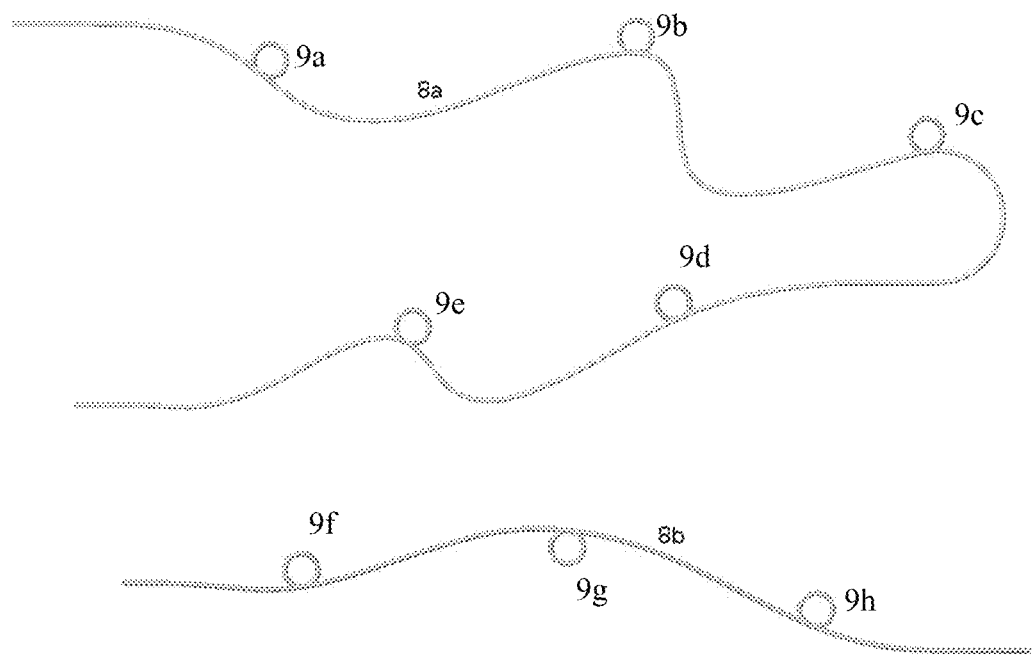
FIG. 7 illustrates an exemplary embodiment of a sensing extension 8A, 8B with a plurality of concentrated point sensors (local signal integrators) 9a-h, according to an aspect.

FIG. 7 illustrates an exemplary embodiment of a sensing extension 8A,B with a plurality of concentrated point sensors (local signal integrators) 9a-h, according to an aspect.

As shown in FIG. 7, a sensing extension 8A,B can be configured to include a plurality of point sensors, such as nine point sensors 9a-h, for example. As an example, point sensors 9a-h may be sensor coils, which are formed by an optical fiber being coiled or bundled and attached to the dedicated structure and/or other mechanical device, wherein the dedicated structure and mechanical device would be exposed to acousto-mechanical disturbances. In essence these point sensors 9a-h would act as sensing nodes distributed along the optical fiber cable deployed around, along, or over the area of interest, such as the perimeter of a property.

Another problem solved is that the disturbance may be below the detection threshold for highly localized or low energy disturbances because, under most environmental conditions, the disturbance signal detected by the sensing extension depends on the length of extension affected by the disturbance. Including a plurality of concentrated point sensors sensing coils intermittently along the sensing extension creates a chain of passive signal concentrators (microphones), which increases the detected signal strength.

Yet another problem solved is the issue of the disturbance signal being impeded by the environment, such as air, due to reflection and low energy transfer efficiency. By using impedance matching techniques, such as a low weight and flexible membranes with a non-ruggedized section of optical fiber, attached to or incorporated into the sensing extension, a chain of passive impedance matching signal concentrators (microphones) is created, thus increasing the detected signal strength.

Figure 8:
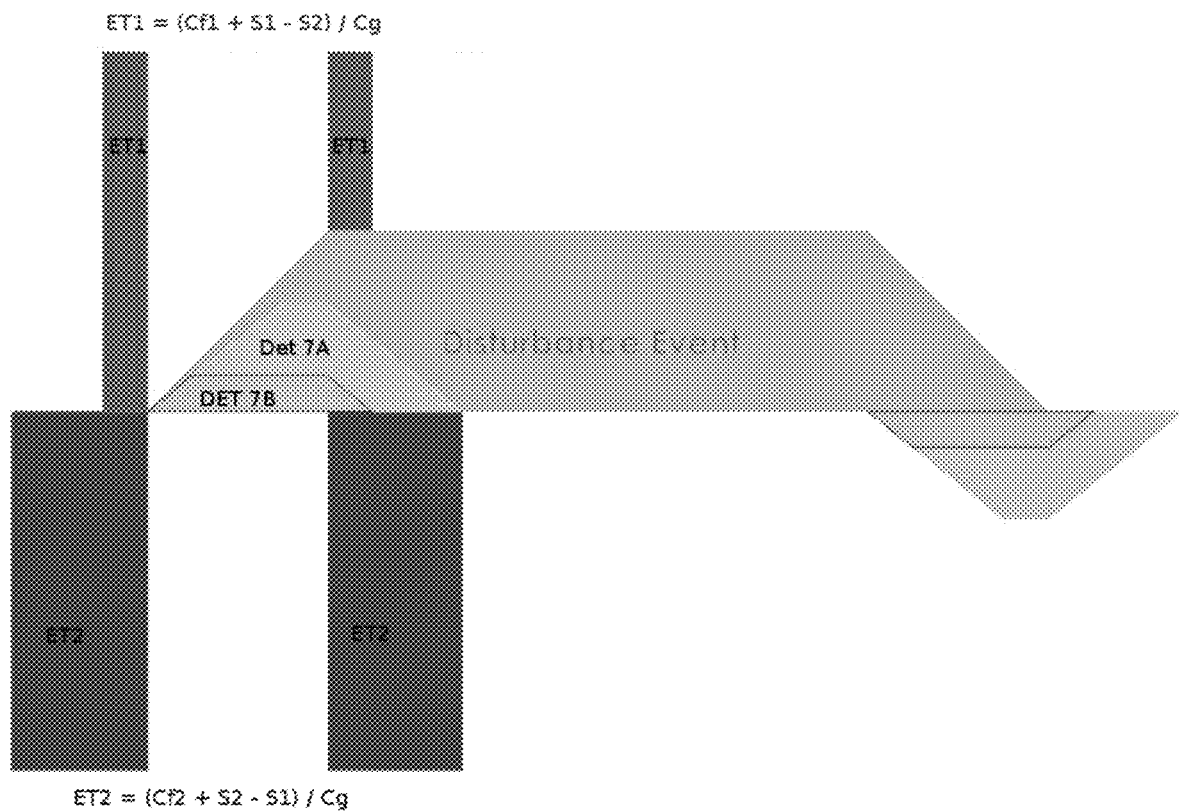
FIG. 8 illustrates exemplary slow rise time signals detected by signal detectors 7A, 7B resulting from a disturbance 11 located closer to reference coil 3A, with respect to the ring interferometer topology disclosed when referring to FIG. 4, according to an aspect.

FIG. 8 illustrates exemplary slow rise time signals detected by signal detectors 7A, 7B resulting from a disturbance 11 located closer to reference coil 3A, with respect to the ring interferometer topology disclosed herein when referring to FIG. 4, according to an aspect.

As shown, the disturbance 11 event is represented in the form of a symmetrical trapezoidal pulse pressure event. For such a disturbance event, a POSITA can clearly see that the signals detected at detectors 7A,B are functions of the ramp-up or ramp-down magnitude of the disturbance event over said ET1 and ET2 intervals respectively. It should be understood that during the "flat top" portion of the trapezoid disturbance event Cv(t)=0, thus no signal V(t) is detected. V(t) is only non-zero during time interval Δt we can see the signal change, i.e., ramp-up and ramp-down. It should be understood that the instantaneous values of V(t) at the detectors 7B,A can be compared or, in cases with a noisy disturbance signal, the integrals of the detected signal over fixed length running time window can be compared.

One obvious problem, which the disclosed ring interferometer topologies solve, arises when the disturbance is located close to a signal fading point. When this occurs, the signal detectors 7A,B will not be able to provide sufficiently defined output. In ring interferometer systems where the topology and dimensions of a deployed system are well defined, such as the topologies disclosed herein, the lack of a sufficiently defined output at one specific signal detector, such as 7A, while well-defined at the other detector, such as 7B, indicates the disturbance location.

Another problem solved by the disclosed ring interferometer topologies disclosed by FIGS. 5, 6 arises when a detected disturbance is not simple, as is the case in most real-world applications. For such cases concept of a predominantly inert system with seldom disturbance events, would need to be adopted. Alternatively, a noise level threshold filter can be created, such that the only events which cause disturbances considered for analysis are sufficiently dynamic (high energy events). Yet another problem arises is when two or more disturbance events are detected simultaneously and both are of a similar characteristic. For these complicated cases of disturbance events, the ring interferometer 100 topologies disclosed when referring to FIGS. 5,6 can be used in combination with aliasing detection and FFT signal analysis employed.

Figure 9:
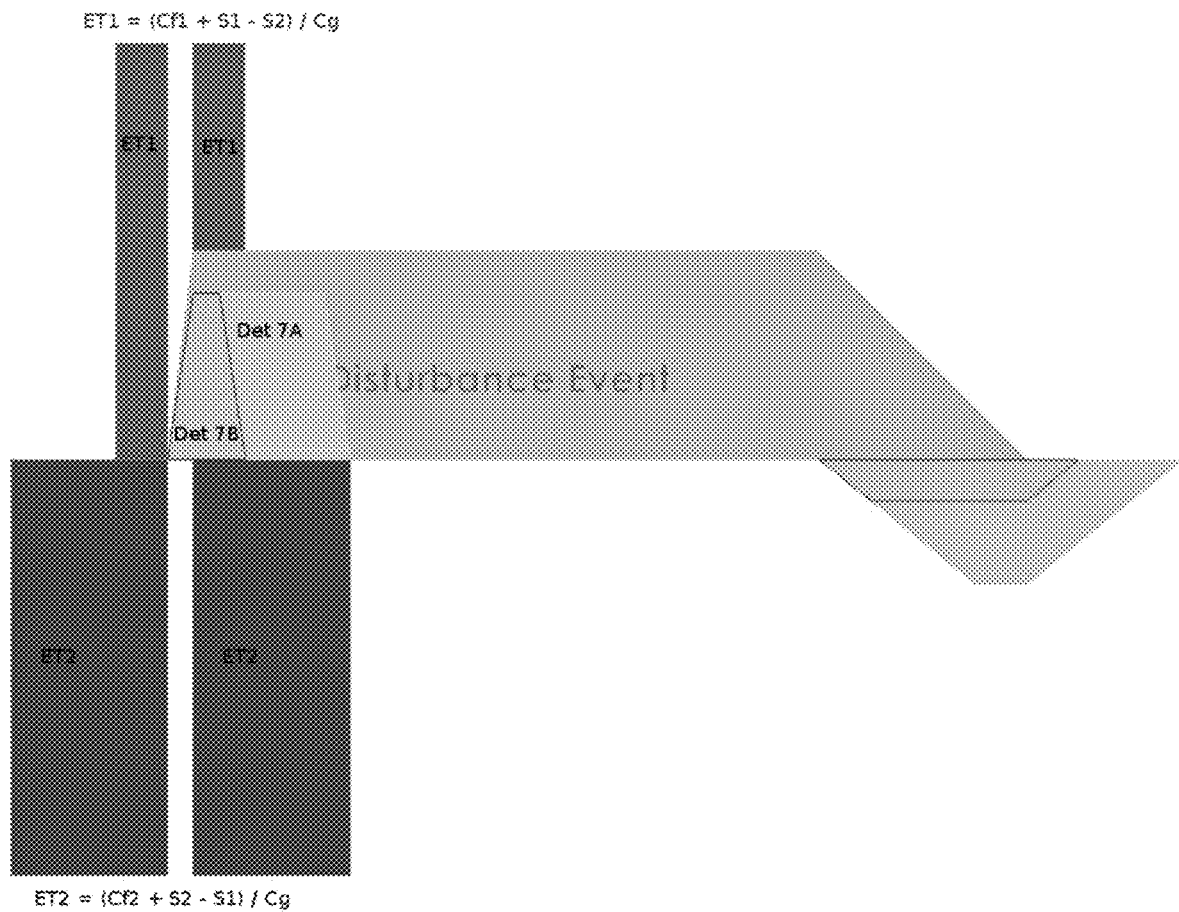
FIG. 9 illustrates exemplary fast rise time signs detected by the signal detectors 7A, 7B from a disturbance 11 located closer to the reference coil 3A, with respect to the ring interferometer topology disclosed when referring to FIG. 4, according to an aspect.

FIG. 9 illustrates exemplary fast rise time signs detected by the signal detectors 7A, 7B from a disturbance 11 located closer to the reference coil 3A, with respect to the ring interferometer topology disclosed herein when referring to FIG. 4, according to an aspect.

It should be understood that, with the necessary modifications, a non-symmetric trapezoidal pressure disturbance can be analyzed similarly to a symmetric trapezoidal pressure disturbance.

Figure 10:
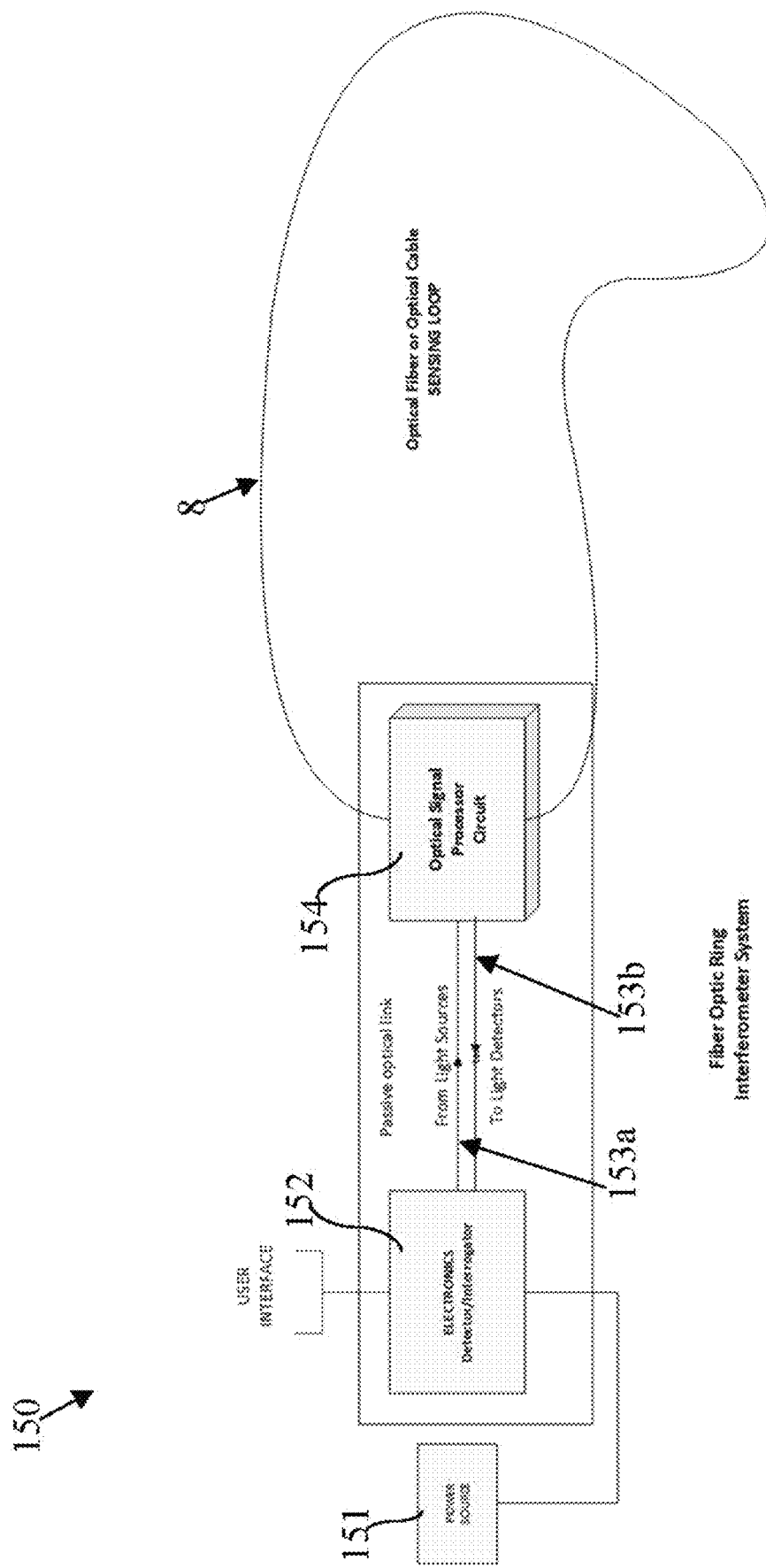
FIG. 10 illustrates an exemplary block diagram for a fiber optic ring interferometer system, according to an aspect.

FIG. 10 illustrates an exemplary block diagram for a fiber optic ring interferometer system, according to an aspect. As shown, the fiber optic ring interferometer system 150 may comprise a power source 151, electronics of light source and detectors with user interface (detector/interrogator) 152, passive optical links 153a,b from the light sources and to the light detectors, respectively, an optical signal processor circuit 154 and an optical fiber sensing extension (sensing extension) 8.

Figure 11:
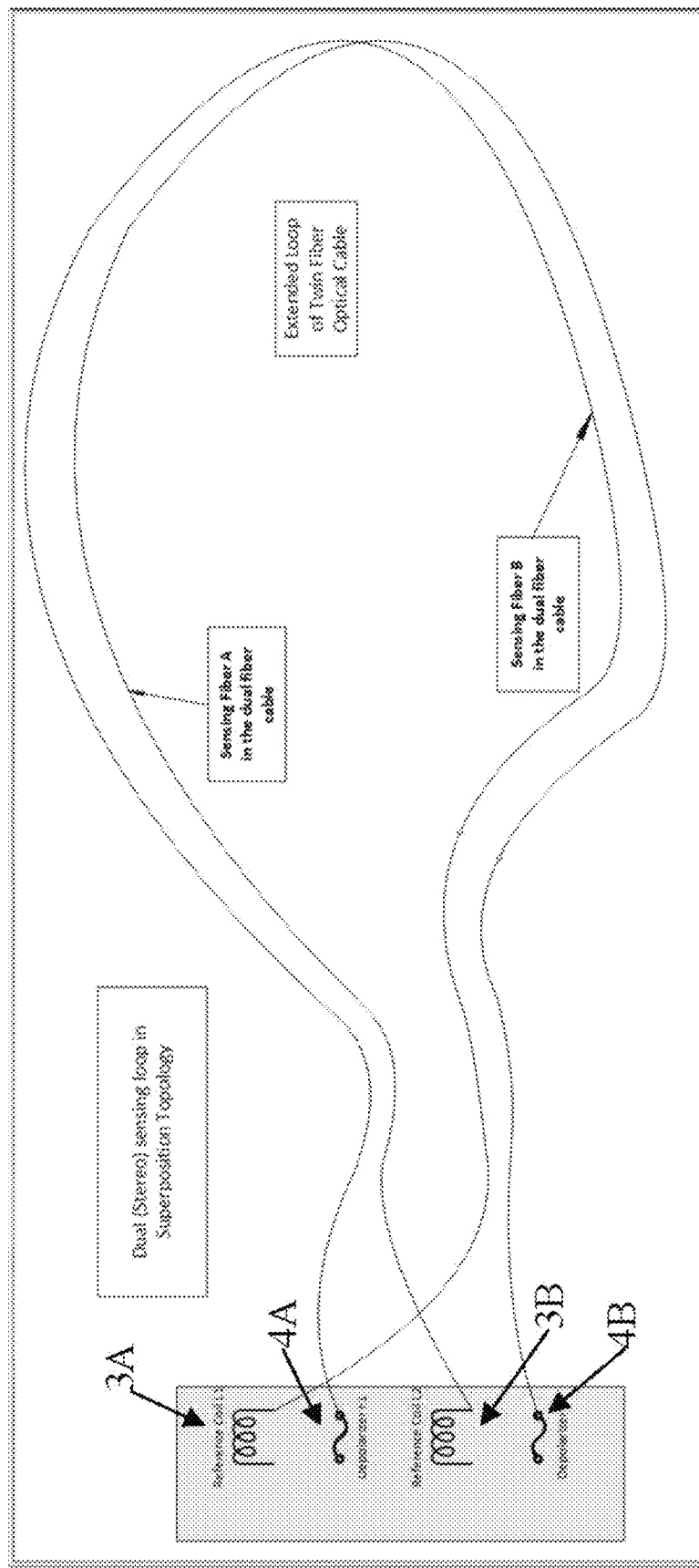
FIG. 11 illustrates an exemplary dual fiber (dual-path) sensing extension 8A,8B, wherein the two sensing extensions 8A,8B form two separate paths, and how it may be attached to an optical signal processor circuit 154, according to an aspect.
Figure 13:
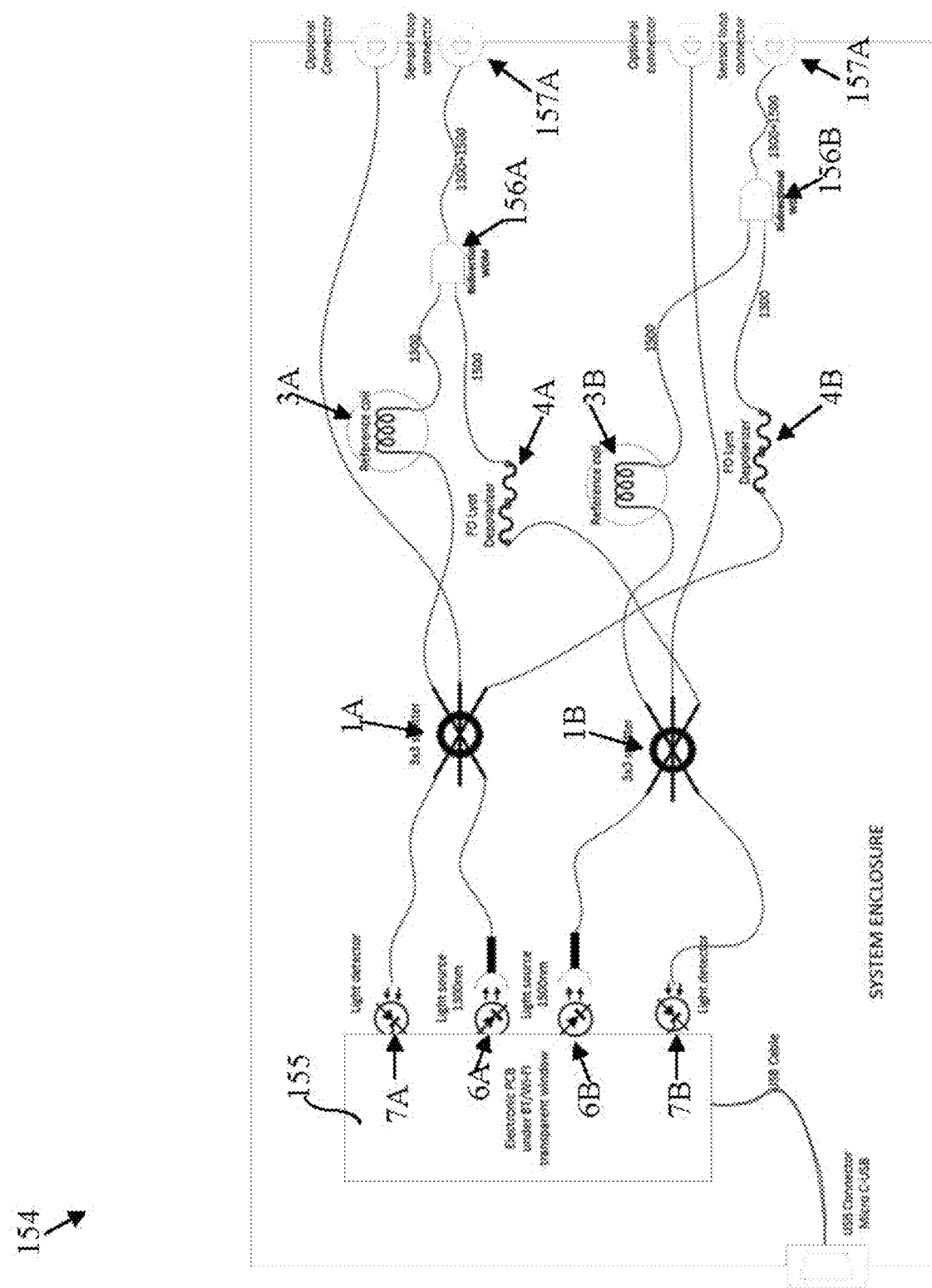
FIG. 13 illustrates an exemplary driver-receiver optical circuit for a ring interferometer with a dual wavelength topology, according to an aspect.
Figure 14:
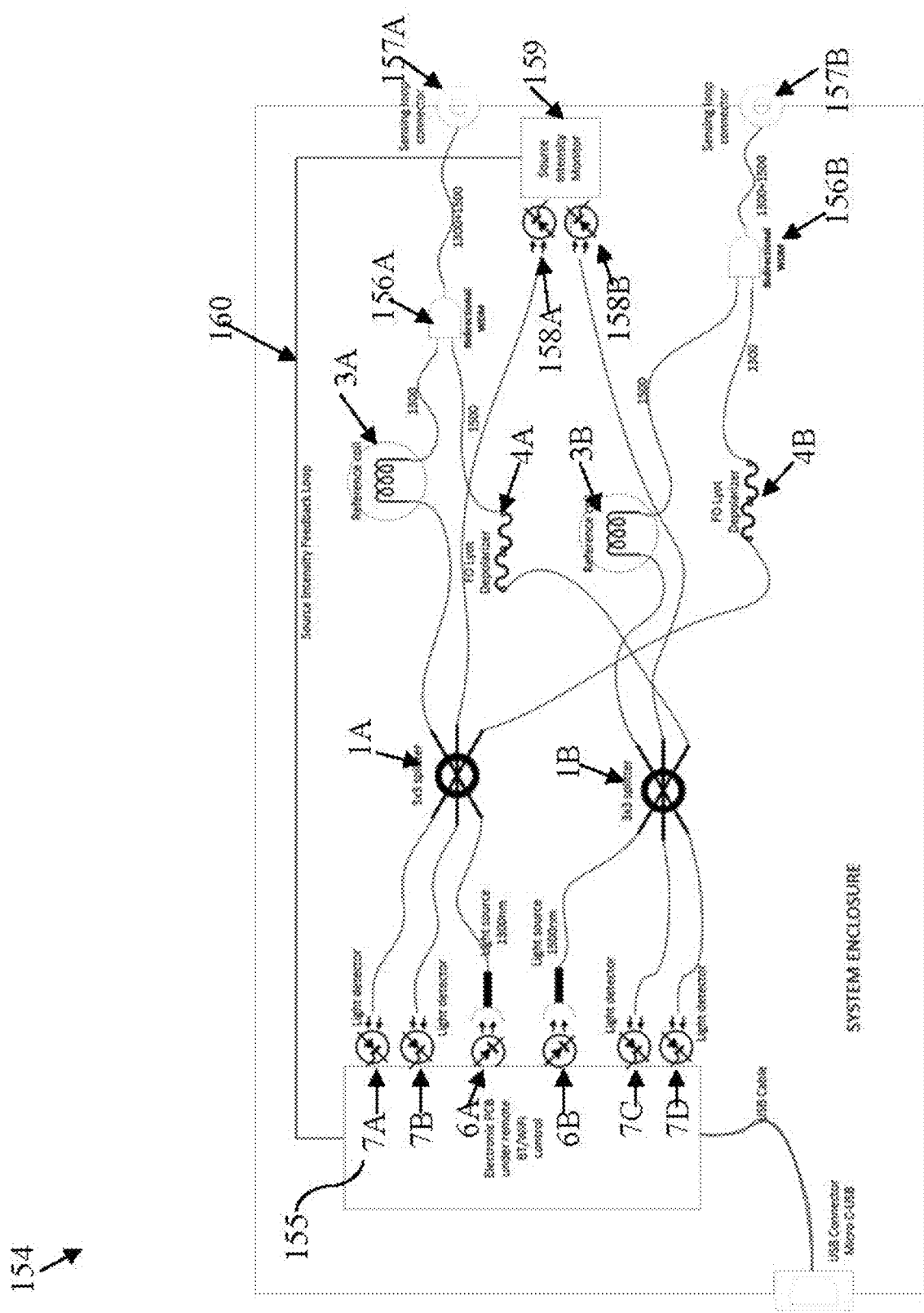
FIG. 14 illustrates another exemplary driver-receiver optical circuit 154 for a ring interferometer with a dual-wavelength topology, wherein light source management feedback 159 and 160 and dual signal detectors 7A, 7B and 7C, 7D are provided to enhance signal recovery, according to an aspect.

As disclosed in greater detail hereinafter, FIG. 11 illustrates an exemplary dual-path sensing extension. Additionally, FIGS. 12, 13, and 14 illustrate exemplary optical signal processor circuits.

FIG. 11 illustrates an exemplary dual fiber (dual-path) sensing extension 8A,B wherein the two sensing extensions 8A,B form two separate paths, and how it may be attached to an optical signal processor circuit 154, according to an aspect. As shown, a dual fiber sensing extension comprises two sensing fibers 8A,B, wherein each sensing fiber 8A,B is connected to a driver-receiver optical circuit 154 via reference coils 3A,B and depolarizers 4A,B respectively. In some configurations, the two sensing fibers (sensing extension extensions) 8A,B may be equipped with a plurality of point sensors (sensor coils), as disclosed when referring to FIG. 7.

Figure 12:
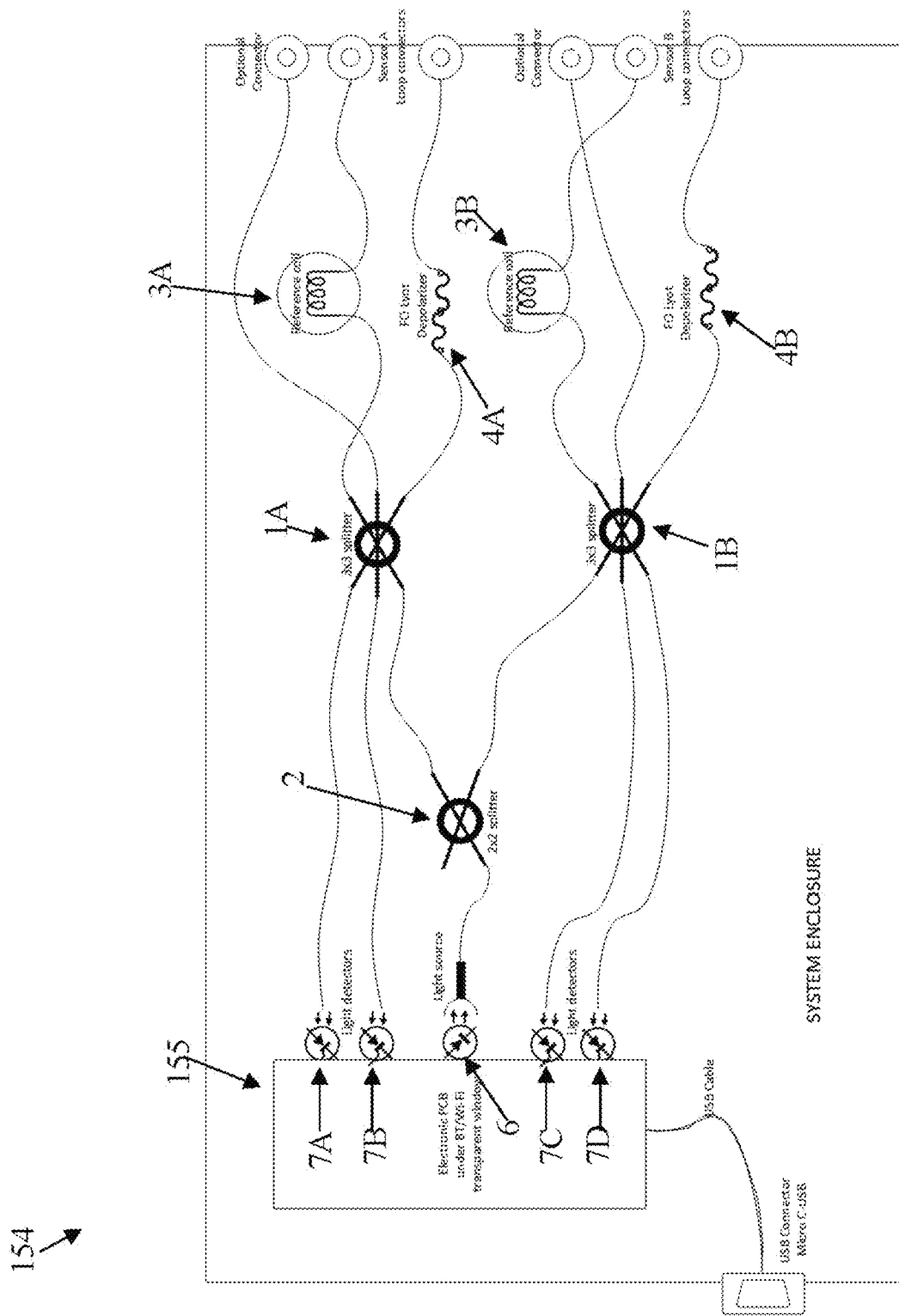
FIG. 12 illustrates an exemplary driver-receiver optical circuit 154 for a ring interferometer system, wherein the driver-receiver optical circuit 154 may be connected to the dual fiber sensing extension of FIG. 11, according to an aspect.

As an example, the dual-path sensing extension shown by FIG. 11 may be connected to the driver-receiver optical circuit 154 shown by FIG. 12. It should be understood that the sensing fibers 8A,B can be either superimposed within a single multi-fiber optical cable superimposed, or collocated. As an example, a colocated topology, with a total number of sensing fiber greater than the minimum number needed for calculations, may be beneficial in working as a common "redundancy." For example, a third sensing fiber could be added as a "redundancy" to the dual-path configuration shown in FIG. 11 (redundancy can be considered but only if there are more fibers in the cable than minimum of two in multi-path topology or more than one in multi wavelength topology.) It should be understood that if the colocated are substantially "distant" with respect to the speed of the disturbance propagation, then an "array" of detectors would be created. Such an array is yet another way to acquire and analyze signals.

FIG. 12 illustrates an exemplary driver-receiver optical circuit 154 for a ring interferometer system, wherein the driver-receiver optical circuit 154 may be connected to the dual fiber sensing extension of FIG. 11, according to an aspect. As shown, driver-receiver optical circuit 154 for a dual-path sensor topology may comprise an electronic PCB 155 which provides a light source 6 and two pairs of light detectors 7A-D, a two-way splitter 2, three-way splitters 1A,B, two reference coils 3A,B, and two depolarizers 4A,B. As stated hereinbefore, the driver-receiver optical circuit 154 shown in FIG. 12 may be connected to the dual-path sensing 8A,B shown by FIG. 11. In other words, the driver-receiver optical circuit 154 is configured for optical communication, such that a split portion of a light beam from the light source can travel through one of the plurality of the reference coils, one of the at least two independent fiberoptic sensing extensions, and through one of the plurality of light depolarizers, and then to one of the plurality of light detectors. Additionally, each optical circuit formed by the each path may constitute separate and independent ring interferometer systems, wherein the sensing extension for each independent optical circuit (path) may have a substantially altered topology to mitigate signal fading, as disclosed herein.

Figure 15:
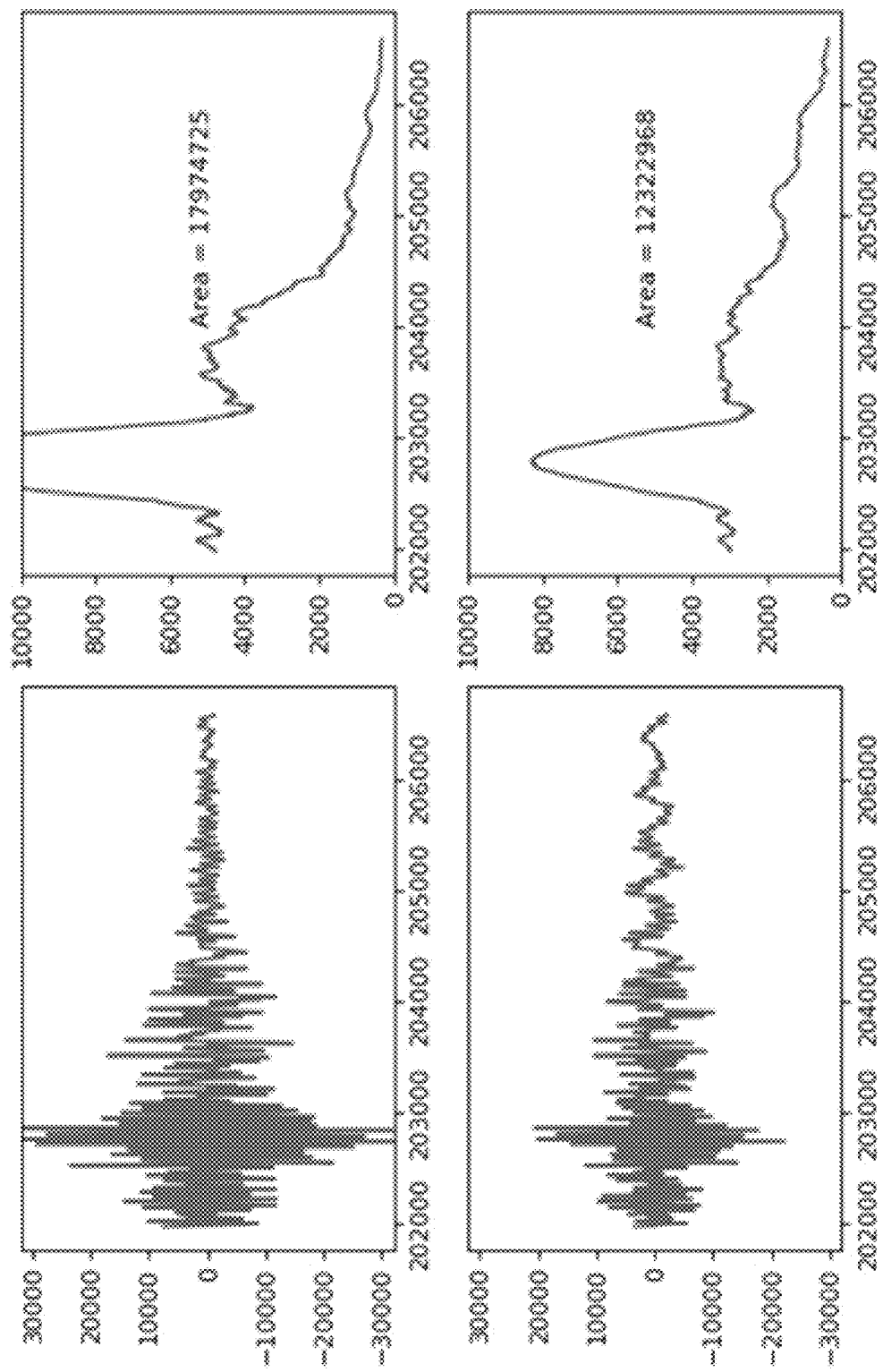
FIG. 15 illustrates exemplary raw waveform and power time plot data representing the signals received from a dual-path ring interferometer, such as the interferometer disclosed when referring to FIG. 11 and FIG. 12, according to an aspect.
Figure 16:
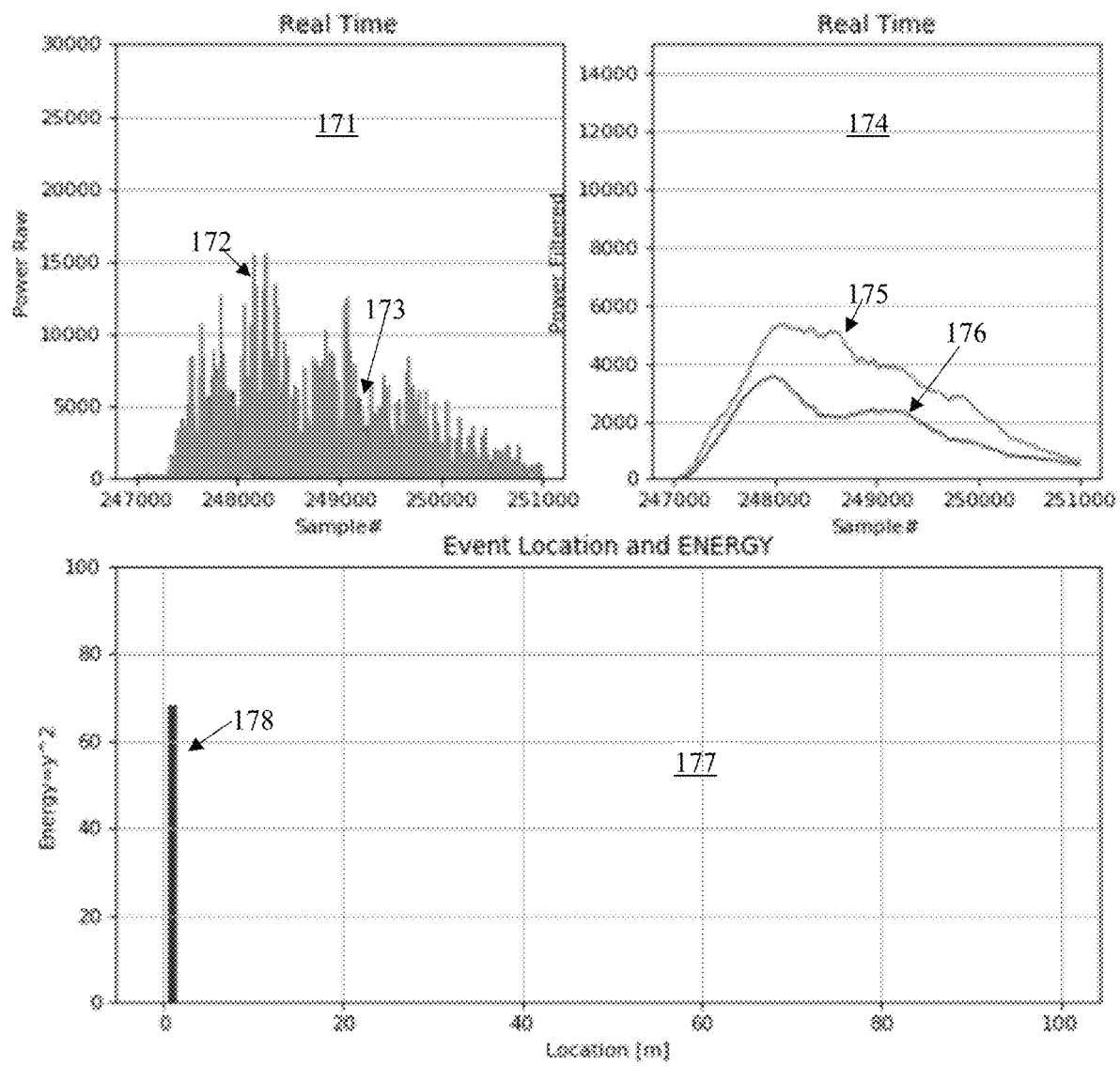
FIG. 16 illustrates exemplary signals received from a dual-path interferometer and the disturbance position, which was calculated based on the energy ratio of the received signals.
Figure 17:
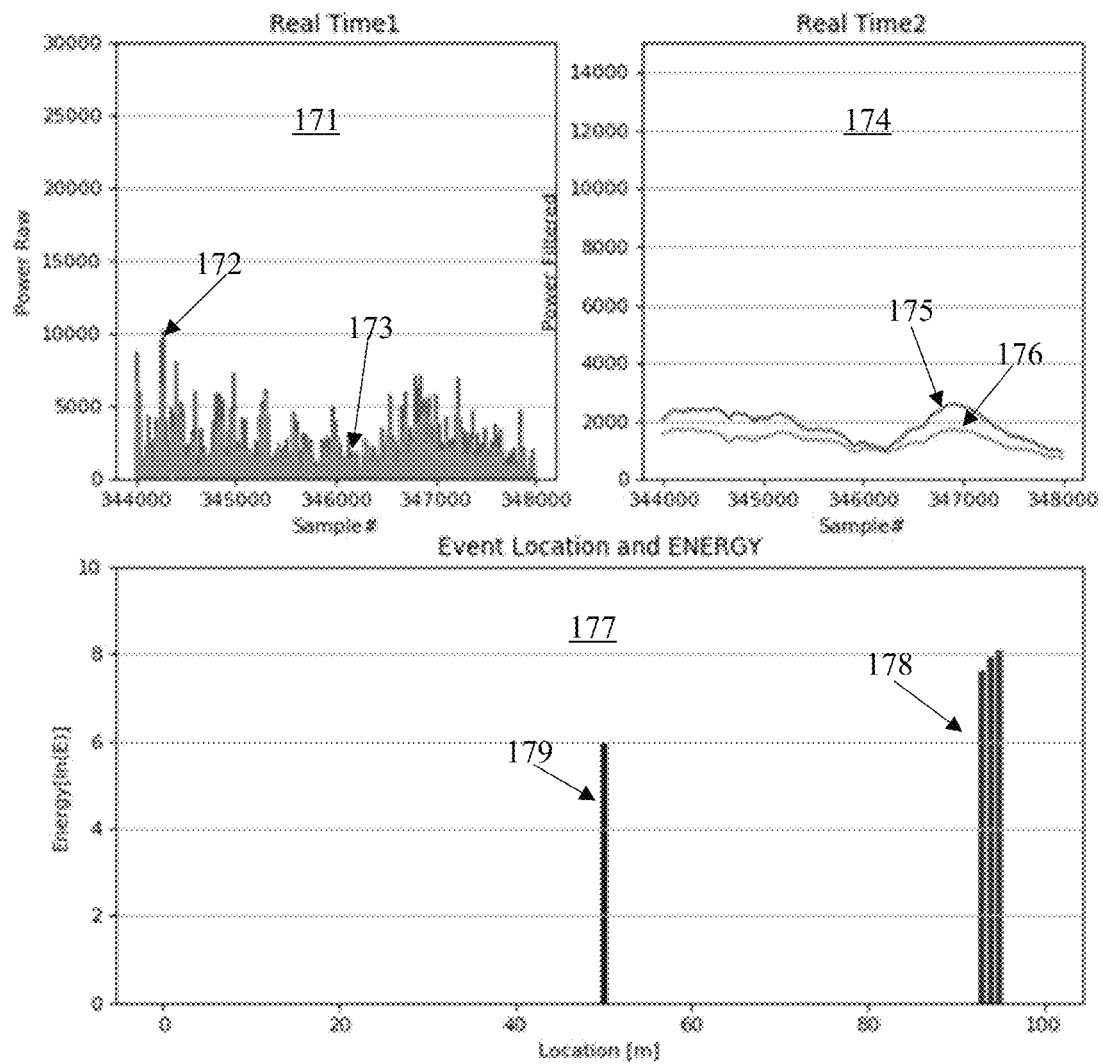
FIG. 17 illustrates alternate exemplary signals received from a dual-path interferometer and the disturbance position, which was calculated based on the energy ratio of the received signal.

Exemplary raw and analyzed data corresponding to the dual-path interferometer system comprising the dual-path sensing extension 8A,B of FIG. 11 and the driver-receiver optic circuit 154 of FIG. 12 is disclosed when referring to FIGS. 15-17.

FIG. 13 illustrates an exemplary driver-receiver optical circuit 154 for a ring interferometer with a dual-wavelength topology, according to an aspect. As shown, the driver-receiver optical circuit 154 for a dual wavelength topology may comprise an electronic PCB 155 which provides two light sources 6A,B and a pair of light detectors 7A,B, three-way splitters 1A,B, two reference coils 3A,B, two depolarizers A,B, two bidirectional WDMs 156A,B, and connections 157A,B for a single path, dual wavelength sensor extension. As shown, light source 6A may provide a 1300 nm light beam, which travels through reference coil 3A, and light source 6B may provide a 1500 nm light beam which travels through reference coil 3B. Then, the 1300 nm and 1500 nm counterpropagating light beam pairs are combined by the bidirectional WDMs 156A,B and sent through a sensing extension. In other words, the ring interferometer topology of FIG. 13 is configured for optical communication, such that a light beam from each of the at least two broadband light sources can travel through a corresponding light beam splitter of the at least two light beam splitters, through the single fiberoptic sensing extension, and through one of the at least two light depolarizers, and then to one of the at least two light detectors.

It should be understood that in this topology and the topology disclosed when referring to FIG. 14, the two pairs counterpropagating light beam are superposed within a single optical fiber sensing extension. It should be noted that the superposition of two or more counterpropagating light beam pairs effectively eliminates insensitivity points (signal fading) on the single-path sensing extension.

FIG. 14 illustrates another exemplary driver-receiver optical circuit 154 for a ring interferometer with a dual-wavelength topology, wherein light source management is provided to enhance signal recovery, according to an aspect. FIG. 14 shows the driver-receiver circuit of FIG. 13 with additional light source management and enhanced signal recovery. The light source management and enhanced signal recovery are archived by utilizing the optional connectors (apertures) 158A,B to connect a source intensity monitor 159, thereby creating a source intensity feedback loop 160. Additionally, the dual light detectors with appropriate electronics increase sensitivity by recovering signal from unused (in FIG. 13) terminal of the 3× splitter.

It should be noted that alternate uses for the optional connectors 158A,B are also possible. For example, the optional connectors can be used to bypass the reference coils 3A,B, thus creating a self-referencing loop, wherein reference coils can be placed at signal fading points, such as that disclosed when referring to FIG. 3.

Again, it should be understood that an innovation of the disclosed invention is determining the disturbance location and characterization by analyzing the amplitudes and phases of signal induced by the disturbance on the sensing extension, wherein the sensing extension has a single-path superposed topology (such as in FIGS. 4-6, 13, 14), a dual-path superimposed topology (such as in FIGS. 11, 12), or a dual-path colocated topology (such as in FIGS. 11, 12). Such an analysis works because all acousto-mechanical environmental disturbances, most of them oscillatory in nature, are rather slow propagating phenomena. Other known methods of disturbance location are based on difficult to discern differences derived from the time of signal arrival from a point of disturbance to the end of the sensing extension convergence point at optical fiber splitter (element #1 in FIGS. 1-6) or frequency spectrums of said induced signals originated from disturbance source of unknown type and characteristics.

In essence both novel topologies for proposed ring interferometers, the Multi-Fiber (multi-path) Sensing Extension (FIGS. 11,12) and the Multi-Frequency (multi-wavelength) Single Fiber Sensing Extension (FIGS. 4-6, 13, 14), are observed as optical fiber sensing system, which can emulate function of human hearing, wherein the signals received by each path or wavelength detector are analog to signals detected by stereo hearing. Then the signals are analyzed to determine point of disturbance along a continuous optical fiber, rather than azimuth and location of source of sound propagating thru the air.

FIG. 15 illustrates exemplary raw waveform and power time plot data representing the signals received from a dual-path ring interferometer, such as the interferometer disclosed when referring to FIG. 12, according to an aspect.

FIG. 16 illustrates exemplary signals received from a dual-path interferometer and the disturbance position, which was calculated based on the energy ratio of the received signals from each path. It should be noted that each detector 7A,B detects the power from the signal received, from which energy can be calculated. Additionally, it should be understood that the energy ratio is a ratio of the energy levels of the signals in each path. It should be noted that the energy ratio is similarly determined in dual-wavelength configurations, such as the topologies shown in FIGS. 13,14. For the raw power 171 chart, the dominant portion of the chart 172 represents data received from detector 7A of FIG. 12 and the smaller portion of the chart 173 represents data received from detector 7B of FIG. 12. For the filtered power chart 174, the line 175 represents data received from detector 7A of FIG. 12 and the line 176 represents data received from detector 7B of FIG. 12. The event location and energy chart 177 represents analyzed data showing the bar 178 which indicates a disturbance event occurring at a location near one end of sensor extension.

FIG. 17 illustrates alternate exemplary signals received from a dual-path interferometer and the disturbance position, which was calculated based on the energy ratio of the received signals from each path For the raw power 171 chart, the dominate portion of the chart 172 represents data receive from detector 7B of FIG. 12 and the smaller portion of the chart 173 represents data received from detector 7A of FIG. 12. For the filtered power chart 174, the line 175 represents data received from detector 7B of FIG. 12 and the line 176 represents data received from detector 7A of FIG. 12. The event location and energy chart 177 represents analyzed data showing the bar 178 which indicates a disturbance event occurring at a location near the end of the sensor extension which is opposite to the end indicated in FIG. 16. The other bar 179 shown by the chart 177 marks the center of the sensing extension and is an artifact of the data processing procedure when detected signals are of similar amplitudes. This artifact is a function of the detector threshold setting and occurs when global noise is high or the threshold is too low.

Essentially, the exemplary data sets shown by FIGS. 16, 17 illustrate the results of the disturbance applied to a specific location along sensing extensions 8A,B of FIG. 11, wherein the disturbance of FIG. 16 occurs closer to one end of the extension and the disturbance of FIG. 17 occurs closer to the other end.

It should be understood that the data from a multi-wavelength topology should look very similar to the data sets shown in FIGS. 15-17, but with better fidelity allowing for more precise determination of the disturbance location.

It may be advantageous to set forth definitions of certain words and phrases used in this patent document. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

The invention claimed is:

1. A fiberoptic ring interferometer system comprising:
   at least two broadband light sources of substantially different center frequencies;
   at least two light detectors;
   at least two light beam splitters;
   at least two light depolarizers;
   at least two reference coils of optical fiber;
   at least two bidirectional Wavelength Division-Multiplexers; and
   a single fiberoptic sensing extension carrying light from said two broadband light sources;
   the system being configured such that a corresponding light beam from each broadband light source of the at least two broadband light sources can travel through a corresponding light beam splitter of the at least two light beam splitters, where each light beam can be split into a corresponding counterpropagating light beam pair, each counterpropagating light beam of each counterpropagating light beam pair being configured to travel through a corresponding reference coil of the at least two reference coils, a corresponding bidirectional Wavelength Divisions-Multiplexer of the at least two bidirectional Wavelength Division-Multiplexers, the single fiberoptic sensing extension and a corresponding light depolarizer of the at least two light depolarizers, to a corresponding light detector of the at least two light detectors.

2. The fiberoptic ring interferometer system of claim 1 wherein each of the at least two broadband light sources can inject a corresponding light beam through one of the at least two light beam splitters into an optical circuit comprising the at least two reference coils and the at least two light depolarizers, wherein each counterpropagating light beam of each counterpropagating light beam pair is guided in-and-out of the single fiberoptic sensing extension through corresponding bidirectional Wave Division Multiplexers of the at least two bidirectional Wave Division Multiplexers.

3. The fiberoptic ring interferometer system of claim 1 wherein the single fiberoptic sensing extension can guide light originating from the at least two broadband light sources emitting light beams of substantially different bands of lights, and wherein, the topology of the fiberoptic ring interferometer loop is configured such that the single fiberoptic sensing extension can have substantially separated points of insensitivity.

4. The fiberoptic ring Interferometer system of claim 1 wherein the optical fiber of the single fiberoptic sensing extension comprises a number of continuously connected sensor coils, each sensor coil representing enhanced sensitivity segment of the single fiberoptic sensing extension.

* * * * *